US009828075B1

(12) United States Patent
Hartman

(10) Patent No.: US 9,828,075 B1
(45) Date of Patent: Nov. 28, 2017

(54) WAKEBOAT HULL CONTROL SYSTEMS AND METHODS

(71) Applicant: SKIER'S CHOICE, INC., Maryville, TN (US)

(72) Inventor: Richard L. Hartman, Twin Lakes, ID (US)

(73) Assignee: Skier's Choice, Inc., Maryville, TN (US)

( * ) Notice: Subject to any disclaimer, the term of this patent is extended or adjusted under 35 U.S.C. 154(b) by 51 days.

(21) Appl. No.: 14/658,980

(22) Filed: Mar. 16, 2015

Related U.S. Application Data

(63) Continuation-in-part of application No. 14/450,828, filed on Aug. 4, 2014, which is a continuation of application No. 13/543,686, filed on Jul. 6, 2012, now Pat. No. 8,798,825.

(51) Int. Cl.
| | | |
|---|---|---|
| *B63B 39/03* | (2006.01) | |
| *B63B 35/73* | (2006.01) | |
| *B63B 1/16* | (2006.01) | |
| *B63B 43/06* | (2006.01) | |
| *G01P 15/00* | (2006.01) | |

(52) U.S. Cl.
CPC ............... *B63B 39/03* (2013.01); *B63B 1/16* (2013.01); *B63B 35/73* (2013.01); *B63B 43/06* (2013.01); *G01P 15/00* (2013.01)

(58) Field of Classification Search
CPC B63B 39/03; B63B 35/73; B63B 1/16; B63B 43/06; B63B 39/02; B63B 1/32; B63B 39/12; B63B 43/04; B63B 43/045; G06F 17/20; G01P 15/00
See application file for complete search history.

(56) References Cited

U.S. PATENT DOCUMENTS

| | | | |
|---|---|---|---|
| 4,095,547 A | | 6/1978 | Benington |
| 4,135,394 A | * | 1/1979 | Middleton et al. ... G01C 13/002 73/170.31 |
| 4,220,044 A | * | 9/1980 | LeBlanc et al. ..... G01C 13/002 73/170.01 |
| 4,872,118 A | | 10/1989 | Naidenov et al. |
| (Continued) | | | |

OTHER PUBLICATIONS

Allegro MicroSystems, Inc., "Fully Integrated, Half Effect-Based Linear Current Sensor IC with 2.1 kVRMS isolation and a Low-Resistance Current Conductor", ACS713-DS, Rev. 11, Oct. 12, 2011, 14 pages.
Analog Devices, Inc., "High Accuracy, Dual-Axis Digital Inclinometer and Accelerometer", ADIS16209, Rev. B., 2009, 16 pages.
Analog Devices, Inc., "Programmable 360° Inclinometer", ADIS16203, Rev. A, 2010, 28 pages.

(Continued)

*Primary Examiner* — Richard Camby
(74) *Attorney, Agent, or Firm* — McAfee & Taft

(57) ABSTRACT

Wakeboat hull control systems are provided that can include a first accelerometer operatively associated with the hull of the wakeboat to measure the acceleration of the hull along a first axis; a second accelerometer operatively associated with the hull of the wakeboat to measure the acceleration of the hull along a second axis, the first axis being non-parallel to the second axis; and processing circuitry calculating the rotation of the hull of the wakeboat about a third axis based on the acquired measurements. Wakeboat hull control methods are provided that can include using the processing circuitry to calculate the rotation of the hull of the wakeboat about a third axis based on the acquired measurements.

11 Claims, 22 Drawing Sheets

(56) References Cited

U.S. PATENT DOCUMENTS

| | | | |
|---|---|---|---|
| 5,385,110 | A | 1/1995 | Bennett |
| 5,549,071 | A | 8/1996 | Pigeon et al. |
| 5,787,835 | A | 8/1998 | Remnant |
| 5,860,384 | A | 1/1999 | Castillo |
| 6,012,408 | A | 1/2000 | Castillo |
| 6,044,788 | A | 4/2000 | Larson et al. |
| 6,105,527 | A | 8/2000 | Lochtefeld et al. |
| 6,158,375 | A | 12/2000 | Stuart, Jr. |
| 6,234,099 | B1 | 5/2001 | Jessen |
| 6,427,616 | B1 | 8/2002 | Hagen |
| 6,505,572 | B1 | 1/2003 | Seipel et al. |
| 6,953,002 | B2 | 10/2005 | Jessen |
| 2003/0183149 | A1 | 10/2003 | Jessen |
| 2005/0155540 | A1 | 7/2005 | Moore |
| 2016/0370187 | A1* | 12/2016 | Gatland et al. ...... G01C 21/203 |

OTHER PUBLICATIONS

Johnson Pumps et al., "Ultra Ballast—Self-Priming, Flexible Impeller Pump Flange Mounted to DC Motorn 12/24 V", Johnson Ultra Ballast Pump Instruction Manuel, 5 pages.

Medallion Instrumentation Systems, "TigeTouch", Instruction Guide, 15 pages.

Microchip Technology, Inc., "28/40/44/64-Pin, Enhanced Flash Microcontrollers with ECAN™ and NanoWatt XLP Technology", PIC18F66K80 Family, 2010-2012, 622 pages.

Rule, "Tournament Series Livewell/Baitwell Pumps,", Instruction Guide, Rev. A, 2006, 2 pages.

Texas Instruments, "Fast General-Purpose Operational Amplifiers,", SLOS063B, 2002, 16 pages.

\* cited by examiner

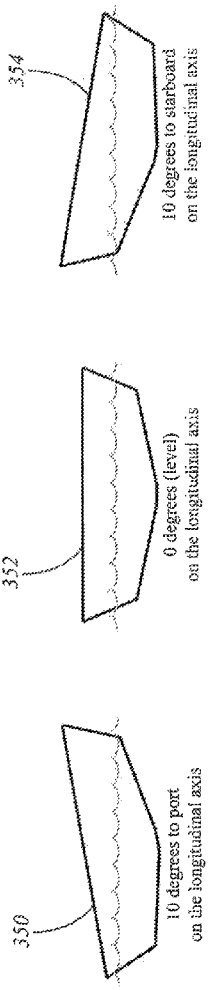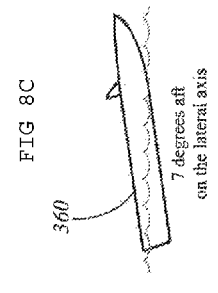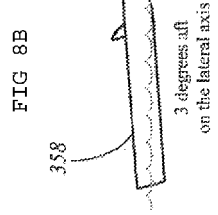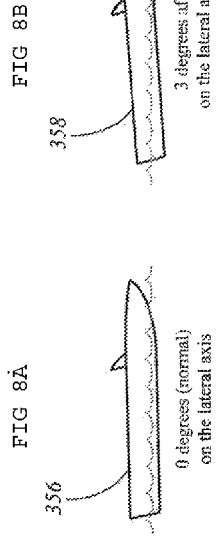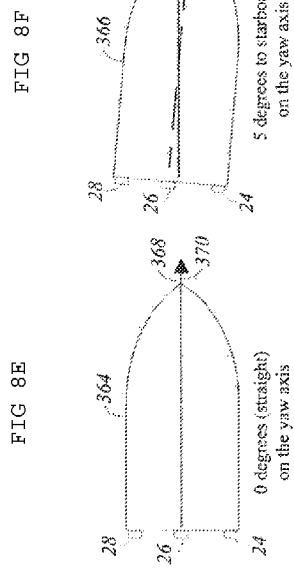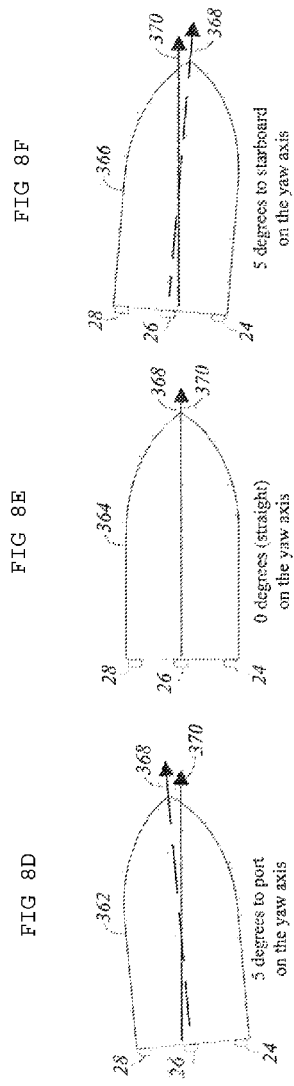

| initial sensor | amount added | final sensor | calculated initial level |
|---|---|---|---|
| 0 | 40 | 100 | 0 |
| 52 | 24.9 | 100 | 15.1 |
| 20 | 26.2 | 70 | 7 |
| 71 | 6.5 | 100 | 33.5 |
| 25 | 30.6 | 100 | 9.4 |
| 50 | 25.3 | 100 | 14.7 |
| 29 | 27.3 | 100 | 12.7 |
| 70 | 7 | 100 | 33 |
| | | | |
| | | | |
| | | | |
| | | | |

| DUAL WAKE | parameter | effect of min setting | effect of mid setting | effect of max setting |
|---|---|---|---|---|
| height | center trim plate | 100 | 100 | 25 |
| | port stern ballast | 0 | 50 | 100 |
| | stbd stern ballast | 0 | 50 | 100 |
| | port bow ballast | 100 | 80 | 70 |
| | stbd bow ballast | 100 | 80 | 70 |
| | hull speed | 90 | 45 | 10 |
| | hull depth | 0 | 50 | 100 |
| length | center trim plate | 100 | 100 | 25 |
| | port stern ballast | 0 | 49 | 125 |
| | stbd stern ballast | 0 | 51 | 125 |
| | port bow ballast | 0 | 13 | 25 |
| | stbd bow ballast | 0 | 15 | 25 |
| | hull speed | 0 | 50 | 10 |
| | hull depth | 20 | 25 | 30 |
| steepness | ... | ... | ... | ... |
| lip sharpness | ... | ... | ... | ... |
| trough depth | ... | ... | ... | ... |
| PORT WAKE | | ... | ... | ... |
| height | ... | ... | ... | ... |
| length | ... | ... | ... | ... |
| steepness | ... | ... | ... | ... |
| lip sharpness | ... | ... | ... | ... |
| trough depth | ... | ... | ... | ... |
| STBD WAKE | | ... | ... | ... |
| height | ... | ... | ... | ... |
| length | ... | ... | ... | ... |
| steepness | ... | ... | ... | ... |
| lip sharpness | ... | ... | ... | ... |
| trough depth | ... | ... | ... | ... |

FIG. 14 side view top view side view bottom view

WAKEBOAT HULL CONTROL SYSTEMS AND METHODS

CROSS REFERENCE TO RELATED APPLICATION

This application is a continuation-in-part of U.S. patent application Ser. No. 14/450,828 which was filed on Aug. 4, 2014, which is a continuation of U.S. patent application Ser. No. 13/543,686 which was filed on Jul. 6, 2012, now U.S. Pat. No. 8,798,825 issued Aug. 5, 2014, the entirety of each of which is incorporated by reference herein.

TECHNICAL FIELD

The present disclosure relates generally to equipment and techniques used on wakeboats. Some embodiments of the disclosure relate to systems and methods that measure the orientation of the hull of a wakeboat in the surrounding water. Other embodiments of the disclosure relate to systems and methods that control the orientation of the hull of a wakeboat in the surrounding water. Techniques for automation action based on orientation of the hull of a wakeboat are also disclosed.

BACKGROUND

Watersports involving powered watercraft have enjoyed a long history. Water skiing's decades-long popularity spawned the creation of specialized watercraft designed specifically for the sport. Such "skiboats" are optimized to produce very small wakes in the water behind the watercraft's hull, thereby providing the smoothest possible water to the trailing water skier.

More recently, watersports have arisen which actually take advantage of, and benefit from, the wake produced by a watercraft. Wakeboarding, wakeskating, and kneeboarding all use the watercraft's wake to enable the participants to perform various maneuvers or "tricks" including becoming airborne.

As with water skiing, specialized watercraft known as "wakeboats" have been developed for these sports. Present-day wakeboats and skiboats are often up to 30 feet in hull length with accommodation for up to 30 passengers. Contrary to skiboats, however, wakeboats seek to enhance the wake produced by the hull using a variety of techniques. The wakes available behind some modern wakeboats have become so large and developed that it is now even possible to "wakesurf", or ride a surfboard on the wake, without a towrope or other connection to the watercraft whatsoever.

Improvements to wakeboats and skiboats and the safety of their operation would be very advantageous to the fast-growing watersports market and the watercraft industry in general.

SUMMARY OF THE DISCLOSURE

Wakeboat ballast pump monitoring systems and methods are provided that include advanced pump monitoring via electrical and hydraulic parameters, and/or correlation of those parameters to the operational condition of the ballast pump or an associated ballast compartment.

Wakeboat ballast control systems and methods are provided that include measurement, storage and recall of hull orientation and draft data in the surrounding water.

Wakeboat ballast control systems and methods are provided that include automatic ballast management to maintain a desired set of parameters.

Wakeboat ballast control systems and methods are provided that enable sharing of wake configuration parameters between multiple wakeboats, and the normalization of such parameters from one wakeboat to another.

Watercraft tank systems and methods are provided that monitor and report the fluid level within one or more tanks, storing historical data and correlating that data to current sensor measurements.

Watercraft bilge pump adapters are provided that can allow bilge pumps to more completely drain accumulated fluids from interior compartments.

Watercraft bilge pump adapters are also provided that accommodate a variety of bilge shapes and profiles Watercraft bilge pump monitoring systems are provided that include advanced pump monitoring, detection of water to be pumped, and detection of certain bilge pump failure modes.

DRAWINGS

Embodiments of the disclosure are described below with reference to the following accompanying drawings.

FIGS. 8A-8H and 8J illustrate three views of boat hulls at various angles around their longitudinal axes, three views of boat hulls at various angles around their lateral axes, and three views of boat hulls at various angles around their yaw axes.

FIG. 14 illustrates a partially populated normalization lookup table.

DESCRIPTION

Figure 1:
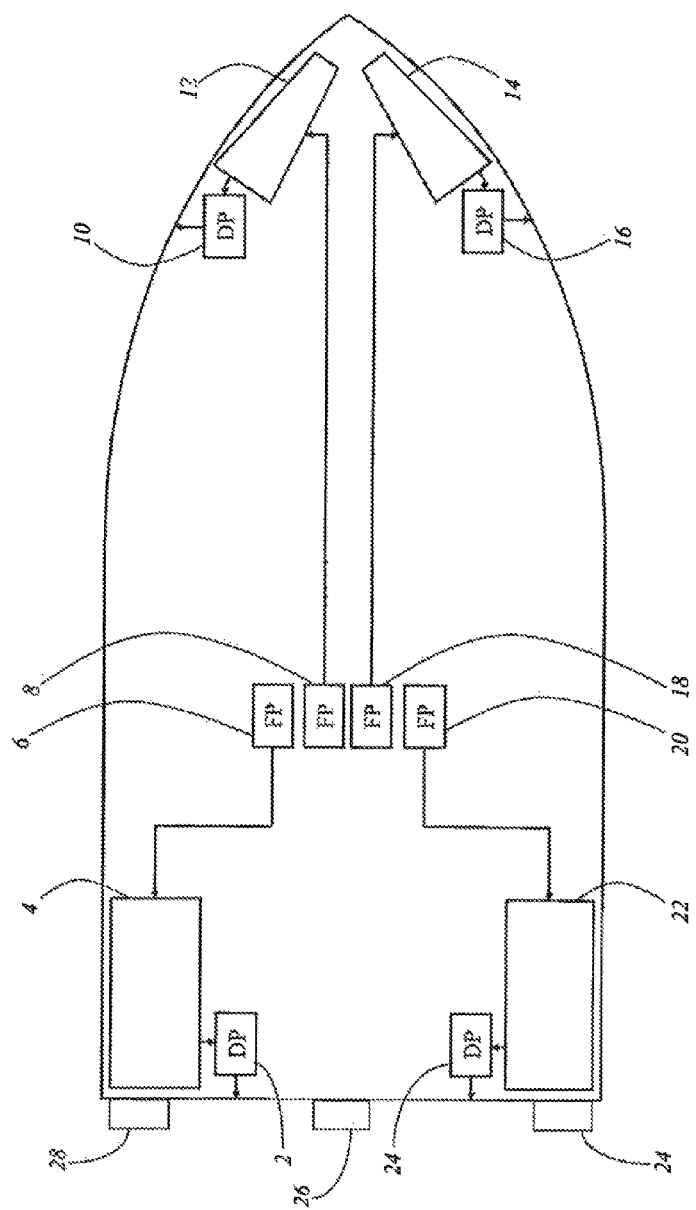
FIG. 1 illustrates the outline of a boat hull with ballast compartments, ballast fill pumps, ballast drain pumps, and associated connecting hoses.

This disclosure is submitted in furtherance of the constitutional purposes of the U.S. Patent Laws "to promote the progress of science and useful arts" (Article 1, Section 8).

The assemblies and methods of the present disclosure will be described with reference to FIGS. 1-22.

Participants in the sports of wakeboarding, wakesurfing, wakeskating, and the like often have different needs and preferences with respect to the size, shape, and orientation of the wake behind a wakeboat. A variety of schemes for creating, enhancing, and controlling a wakeboat's wake have been developed and marketed with varying degrees of success.

For example, many different wakeboat hull shapes have been proposed and produced. Another approach known in the art is to use a "fin" or "scoop" behind and below the wakeboat's transom to literally drag the hull deeper into the water. Yet another system involves "trim plates": control surfaces generally attached via hinges to the wakeboat's transom, whose angle relative to the hull can be adjusted to "trim" the attitude of the hull in the water. The angles of trim plates are often controlled by electric or hydraulic actuators, permitting them to be adjusted with a switch or other helm-accessible control.

One goal of such systems is to cause the wakeboat's hull to displace greater amounts of water, thus causing a larger wake to form as the water naturally seeks to restore equilibrium after the hull has passed. Another goal is to finely tune the shape, location, and behavior of the wake to best suit the preferences of each individual participant.

The predominant system has evolved to include specialized hull shapes, trim plates, and water as a ballast medium to change the position and attitude of the wakeboat's hull in the water. Water chambers are installed in various locations within the wakeboat, and one or more pumps are used to fill and empty the chambers. The resulting ballast system enables the amount and distribution of weight within the watercraft to be controlled and adjusted.

Improved embodiments of wakeboat ballast systems have involved placing the ballast sacks in out-of-the-way compartments, the occasional use of hardsided tanks as opposed to flexible sacks, permanent installation of the fill and drain pumps and plumbing through the hull, permanent power supply wiring, and console-mounted switches that enabled the wakeboat's driver to fill and drain the various ballast chambers from a central location. Such installations became available as original equipment installed by wakeboat manufacturers themselves. They were also made available as retrofit packages to repurpose existing boats as wakeboats, or to improve the performance and flexibility of wakeboats already possessing some measure of a ballast system. These permanent or semi-permanent installations became known by the term "automated ballast systems", a misnomer because no automation was involved; while the use of switches and plumbing was certainly more convenient than loose pumps plugged into cigarette lighter outlets, their operation was still an entirely manual task.

FIG. 1 illustrates a wakeboat ballast system, for example. Four ballast compartments are provided: A port aft (left rear) ballast compartment 4, a starboard aft (right rear) ballast compartment 22, a port bow (left front) ballast compartment 12, and a starboard bow (right front) ballast compartment 14. Two pumps serve to fill and drain each ballast compartment. For example, ballast compartment 4 is filled by Fill Pump (FP) 6 which draws from the body of water in which the wakeboat sits through a hole in the bottom of the wakeboat's hull, and is drained by Drain Pump (DP) 2 which returns ballast water back into the body of water. Additional Fill Pumps (FP) and Drain Pumps (DP) operate in like fashion to fill and drain their corresponding ballast compartments.

The proliferation of wakeboat ballast systems and centralized vessel control systems has increased their popularity, but simultaneously exposed many weaknesses and unresolved limitations. For example, such so-called "automated" wakeboat ballast systems rely on ballast pump run time to estimate ballast compartment fill levels with no feedback mechanism to indicate full/empty conditions, no accommodation for air pockets or obstructions that prevent water flow, and other anomalous conditions that frequently occur. Relying solely on ballast pump run time can thus yield wildly inaccurate and unrepeatable ballasting results. So-called "automated" ballast systems thus purport to accurately restore previous conditions, when in fact they are simply making an estimate—to the frustration of participants and wakeboat operators alike.

Figure 2:
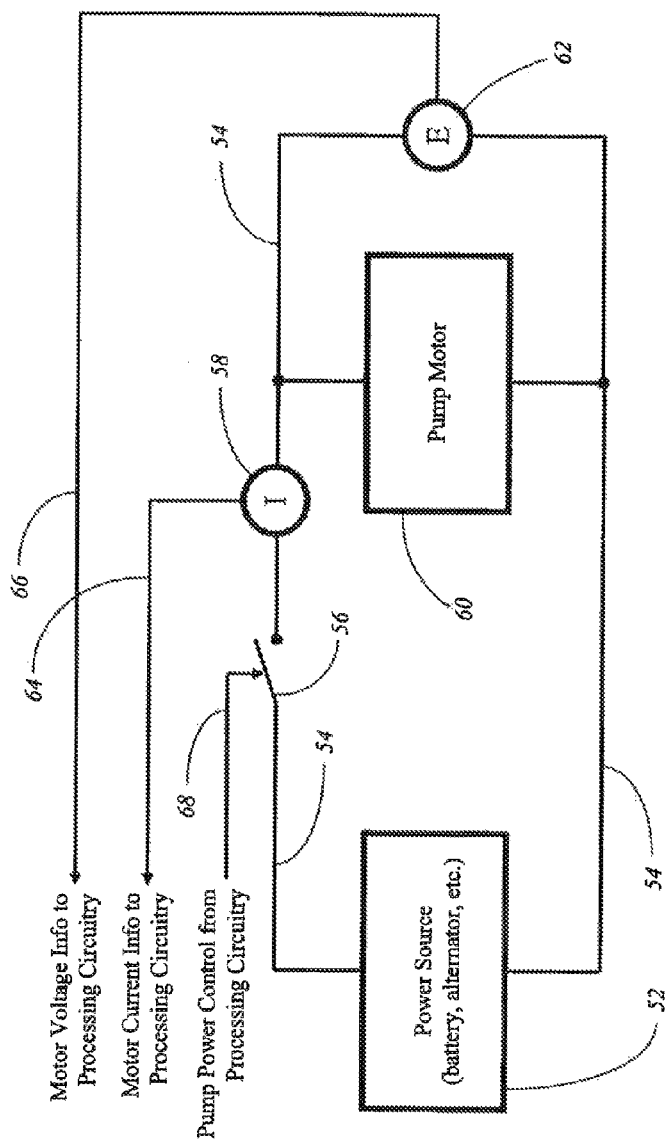
FIG. 2 is a block diagram of a ballast pump configured with voltage and current measurement, a power source, circuit interrupters, and associated electrical interconnections.

Referring to FIG. 2, a motor for a single Fill Pump (FP) or Drain Pump (DP) is shown according to an embodiment of the disclosure. In one embodiment, a ballast pump can include an electric motor 60 operatively coupled to an electrical power source 52 such as a battery or alternator. The ballast pump may be an impeller style pump such as the Johnson Ultra Ballast Pump (Johnson Pump of America, Inc., 1625 Hunter Road, Suite B, Hanover Park Ill., 60133, United States), a centrifugal style pump such as the Rule 405FC (Xylem Flow Control, 1 Kondelin Road, Cape Ann Industrial Park, Gloucester Mass., 01930, United States), or another pump whose characteristics suit the specific application. An advantage of an embodiment of the present disclosure can be achieved using either of these pumps and/or others that possess varying degrees of similarity.

Power to ballast pump motor 60 can be controlled by circuit interrupter 56, shown as a single device for clarity but which may be one or more of a manual switch, a relay or functionally similar device controlled by control signal 68, or other components suitable for making and breaking circuit 54 manually or under system control. When circuit interrupter 56 is closed and thus circuit 54 is completed through pump motor 60, the voltage from power source 52 will be applied to pump motor 60 and current will flow through circuit 54 according to Ohm's Law.

Continuing with FIG. 2, the voltage across pump motor 60 and the current flowing in circuit 54 are affected by the physical load encountered by pump motor 60. This is due to the phenomenon known as back electromotive force or counter-electromotive force, commonly abbreviated as CEMF, wherein a rotating motor itself generates a voltage opposite to that which is powering it. CEMF is directly proportional to motor speed, so a nonrotating motor generates zero CEMF while a motor spinning at full speed generates its maximum CEMF.

While CEMF is in fact an opposition voltage generated by a motor, its real world effect is as a motor's resistance to current flow. Thus CEMF can also be conveniently described as a motor's resistance—a resistance that varies in direct proportion to the motor's speed. When a motor is first started, or when its load is so great that the motor cannot overcome it and stalls, its CEMF is zero. When the motor is able to free run without load, both speed and CEMF can reach their maximums.

For example, when circuit 54 of FIG. 2 has been open and is then closed, pump motor 60 will initially be motionless, be generating no CEMF, and thus have minimum resistance. Pump motor 60 will act as nearly a dead short and the current flowing in circuit 54 will be relatively high. Therefore, according to Ohm's Law, the voltage across (relatively low resistance) pump motor 60 will be reduced.

Once pump motor 60 of FIG. 2 begins to rotate, it also begins to generate CEMF and thus its effective resistance increases. Again according to Ohm's Law, this increased resistance reduces the current flowing in circuit 54 and increases the voltage across pump motor 60. The speed of pump motor 60 will increase until equilibrium is reached between the CEMF of pump motor 60 and the voltage of power source 52, at which time the speed of pump motor 60 will stabilize.

As shown in FIG. 2 the present disclosure can include a voltage sensor 62 to make motor voltage information available via signal 66. (The symbol "E" is used to indicate voltage in accordance with Ohm's Law.) Embedded microprocessors and other forms of processing circuitry commonly include analog inputs that detect and measure voltages. Sensor 62 can be an analog input of this type, or another voltage sensor whose characteristics suit the specific application.

As just one example, the processing circuitry of the present disclosure can comprise a PIC18F25K80 microcontroller (Microchip Technology Inc., 2355 West Chandler Boulevard, Chandler Ariz., 85224-6199, United States) or another device whose characteristics suit the specific application. The PIC18F25K80 includes multiple analog inputs that directly sense an applied voltage. In one embodiment of the present disclosure, one of these analog inputs could be used to sense the voltage across a pump motor.

Figure 20:
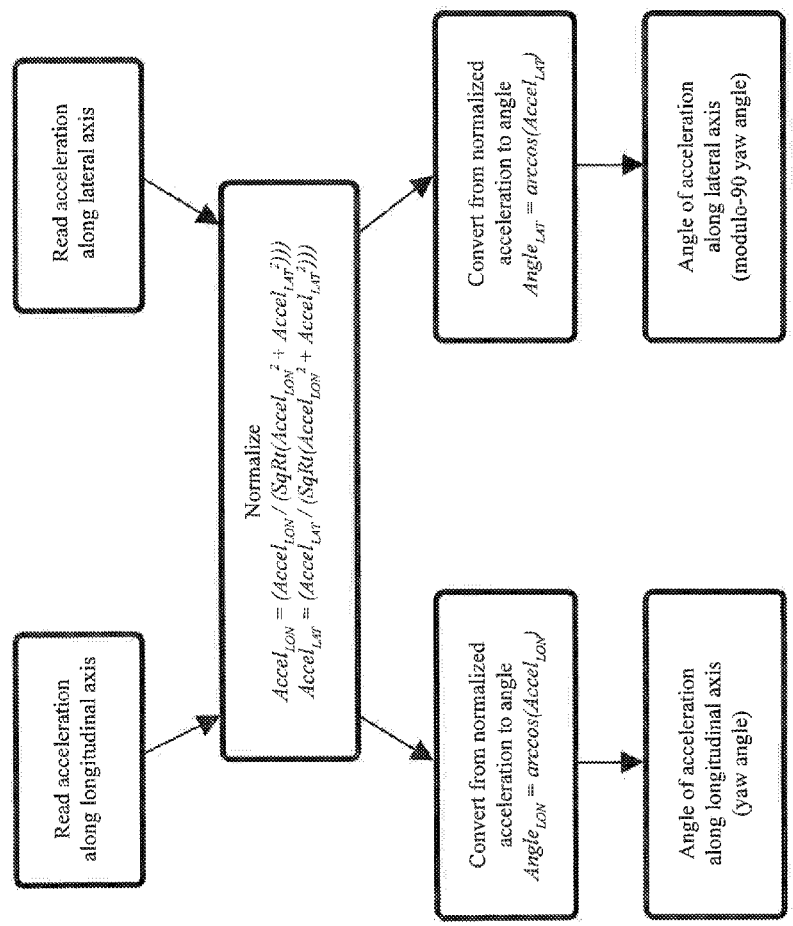
FIG. 20 is a block diagram of an analog input on a microcontroller being used to determine the voltage on the electric motor of a pump.

Again referring to FIG. 2, motor voltage info 66 could be connected to the positive side of pump motor 60 at location 62. The microcontroller would thus be able to use one of its analog inputs to measure the motor voltage info 66. A block diagram of this arrangement is shown in FIG. 20.

As shown in FIG. 2, the present disclosure also includes a current sensor 58 to make motor current information available via signal 64. (The symbol "I" is used to indicate current in accordance with Ohm's Law.) Current sensor 58 may be, for example, an ACS713 integrated conductor sensor (Allegro MicroSystems, Inc., 115 Northeast Cutoff, Worcester Mass., 01606, United States) or another device whose characteristics suit the specific application. The output of the integrated conductor sensor becomes motor current info 64 and can be applied to an analog input of the embedded microprocessors or other processing circuitry.

In another embodiment of the present disclosure, current sensor 58 may be a series resistor. According to Ohm's Law, a voltage develops across a resistor when current flows through it. The aforementioned analog inputs available on embedded microprocessors and other forms of processing circuitry may measure the voltages on either side of the resistor and, based on the voltage difference and the resistor's value, use Ohm's Law to calculate the motor current.

Figure 21:
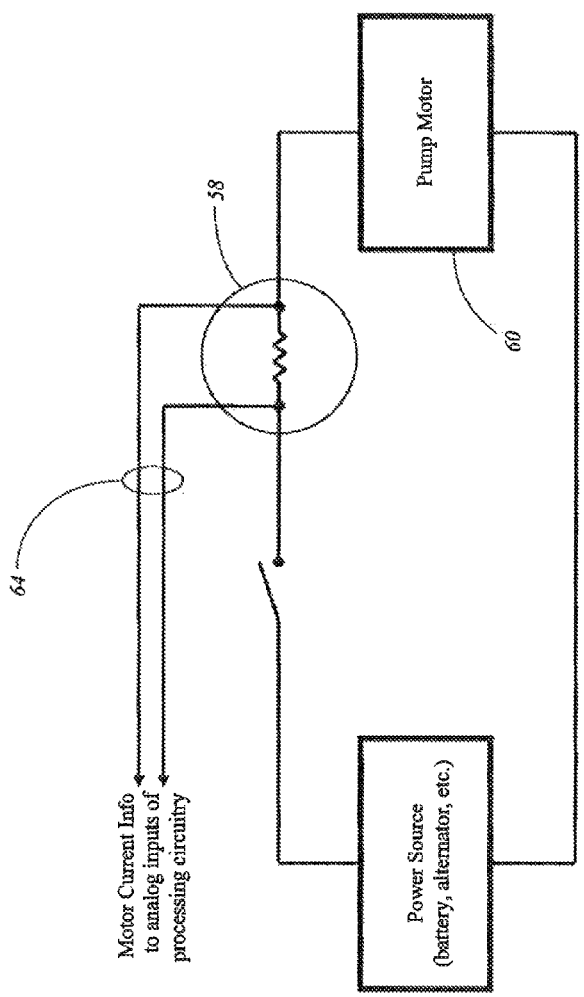
FIG. 21 is a block diagram of two analog inputs on a microcontroller being used to determine the current flowing through the electric motor of a pump, by measuring the voltage drop across a resistor in series with the electric motor.

Returning to the example using the microcontroller, one embodiment of the present disclosure can use two of the microcontroller analog inputs to measure the voltage on either side of the aforementioned series resistor. The voltage across the series resistor will vary in proportion with the motor current; the microcontroller can thus calculate the motor current based on the difference in the voltages measured on either side of the series resistor. A block diagram of this arrangement is shown in FIG. 21.

Figure 22:
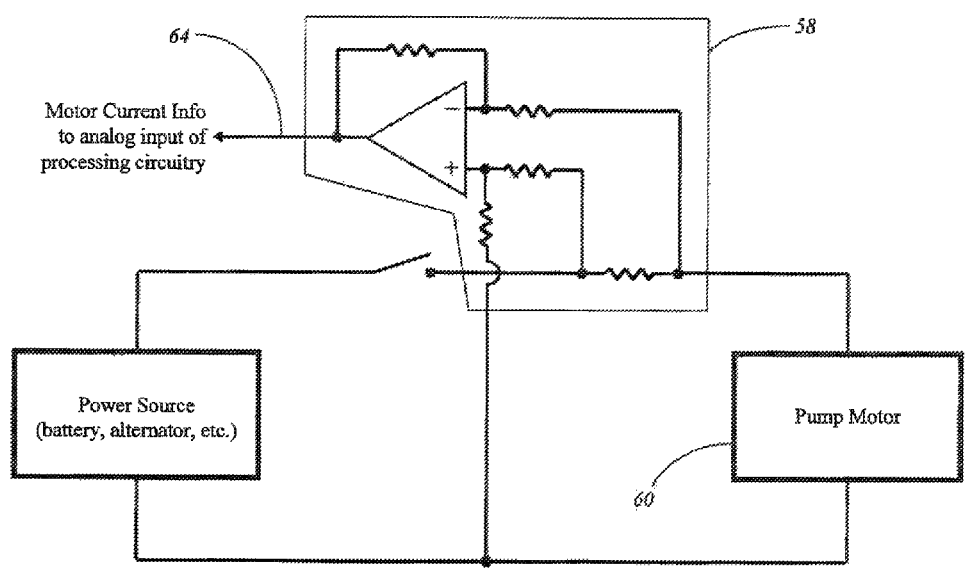
FIG. 22 is a block diagram of an analog input on a microcontroller being used to determine the current flowing through the electric motor of a pump, by measuring the output of a differential amplifier that is sensing the voltage drop across a resistor in series with the electric motor.

In another embodiment of the present disclosure, an operational amplifier can be configured in differential mode to directly measure the voltage across the series resistor. The operational amplifier could be, for example, an LM318 (Texas Instruments Inc., 12500 TI Boulevard, Dallas Tex. 75243, United States) or another device whose characteristics suit the specific application. The output voltage of the operational amplifier may then be monitored by a single analog input of the processing circuitry. One advantage of this embodiment is the reduction in the number of analog inputs required to realize this aspect of the present disclosure. Another advantage of this embodiment is the elimination of the need for the processing circuitry to perform the Ohm's Law calculations. A block diagram of this arrangement is shown in FIG. 22, for example.

Some embodiments of the present disclosure may use voltage, others may use current, and still others may use both depending upon the type of pump motor and the characteristics being monitored. In some embodiments, the processing circuitry may manipulate motor voltage info 66 and motor current info 64, for example by adjusting their offsets and dynamic range, to improve compatibility with system 154.

In contrast to the elapsed-time schemes of existing wakeboat ballast systems, the present disclosure as illustrated in FIG. 2 takes advantage of CEMF to monitor the actual operating conditions of pump motor 60 and the associated ballast compartment(s) it is filling or draining. Monitoring CEMF enables the present disclosure to monitor the speed and workload of pump motor 60, and thus to monitor the flow of water or other ballast medium as it enters and leaves the ballast compartments.

An example fill and drain cycle for a single ballast compartment can include the following. Presume that pump motor 60 of FIG. 2 is the Fill Pump (FP) for the ballast compartment in question. When pump motor 60 is operating normally and pumping water into the ballast compartment, it will have a characteristic rotational speed which will yield characteristic voltage and current values in circuit 54.

Depending upon which sensors are present in the specific embodiment of the present disclosure, voltage sensor 62, current sensor 58, or both will thus report values which are consistent with normal operation.

Continuing with FIG. 2, eventually the ballast compartment will fill to capacity. At that time, pump motor 60 will encounter increased hydraulic backpressure—simply stated, it is not as easy to pump water into a full ballast compartment. In the case of a nonvented compartment the water flow may be stopped in its entirety. In the case of vented compartments, the relatively low backpressure of venting air will be replaced by the much higher backpressure that results when trying to force water through the same vent. The result will be a substantial reduction in water flow and a corresponding speed change in pump motor 60. As described above, a speed change in pump motor 60 results in a voltage change detectable by voltage sensor 62 or a current change detectable by current sensor 58. Such changes will appear on signals 66 or 64, indicating to processing circuitry with actual measured data that the ballast compartment is full; and pump motor 60 can then be automatically depowered by processing circuitry via control signal 68 which controls circuit interrupter 56, or the wakeboat operator can be notified to manually turn off circuit interrupter 56, depending upon the specifics of the implementation.

Continuing to the draining phase, presume that pump motor 60 of FIG. 2 is the Drain Pump (DP) for the now-filled ballast compartment in question. When pump motor 60 is operating normally and draining water out of the ballast compartment, it will have a characteristic speed which will yield characteristic voltage and current values in circuit 54. Depending upon which sensors are present in the specific embodiment of the present disclosure, voltage sensor 62, current sensor 58, or both will thus report values which are consistent with normal operation—thus indicating that water is flowing out of the ballast compartment.

Proceeding with FIG. 2, eventually the ballast compartment will drain completely. At that time, pump motor 60 will see a reduced workload—because pumping air takes less energy than pumping water. The result will be a speed change in pump motor 60 and a corresponding voltage change detectable by voltage sensor 62 or a current change detectable by current sensor 58. Such changes will appear on signals 66 or 64, indicating to processing circuitry with actual measured data that the ballast compartment is empty. Pump motor 60 can then be automatically depowered by processing circuitry via control signal 68 which controls circuit interrupter 56, or the wakeboat operator can be notified to manually turn off circuit interrupter 56, depending upon the specifics of the implementation.

Based upon the specific pumps, sensors, and other components chosen for the specific implementation, the present disclosure will have known and expected operational values for each pump in the ballast system. The detection of these values by the present disclosure provides real world feedback of what is actually happening. This stands in contrast to the open loop approach of time-based systems where the pump may continue to run without regard to what is actually occurring. The results can be as benign as wasting energy and draining batteries, to as severe as damaging pumps that are not intended to run "dry" or with occluded flow.

Pump runtime can still play an important role in the present disclosure. For example, the present disclosure can sense and record the normal amount of time required to fill a given ballast compartment. Armed with this data, if during the aforementioned fill operation the voltage sensor 62 or the current sensor 58 of FIG. 2 indicates that water flow has changed unexpectedly—for example, that water flow has reduced long before the ballast compartment should have been filled—the present disclosure can take appropriate action. Such action may include audible or visual notification of the wakeboat operator. In addition, the present disclosure may itself attempt to correct the unexpected situation. For the present example, unexpectedly reduced flow is often caused by an obstruction—a leaf, clump of weeds, or perhaps litter such as a plastic bag sucked up against the intake for the ballast pump associated with pump motor 60. The present disclosure may attempt to resolve this via processing circuitry using control signal 68 to open circuit interrupter 56 for a short time to turn off pump motor 60, temporarily eliminating the suction and permitting the obstruction to drop away from the hull (or be swept away if the hull is moving through the water). If the pump in question can be operated in reverse, the present disclosure could also take advantage of that ability to forcefully "blow" the intake clear. After remedial actions have been taken, normal power can then be restored by processing circuitry and conditions monitored to confirm normal operation. Similar approaches may also prove useful in resolving problems such as air pockets or airlocks. Several attempts could be made to resolve the situation autonomously before alerting the wakeboat operator and requiring manual intervention.

From the above it is clear that the unique advantages of the present disclosure can automatically handle commonplace problems that are beyond the scope of existing ballast systems. However, the utility of the present disclosure goes beyond convenience and can actually increase the safety of those watercraft on which it is installed.

For example, it is a common occurrence that hoses come loose, and fittings fail, in the challenging and vibration-prone environment of a watercraft. Since most ballast systems are mounted out of sight, such a failure is very likely to go unnoticed. If one or more Fill Pumps (FP) are turned on in such a condition, the result is one or more high volume pumps filling out-of-sight areas with water at a very high rate—with that water flowing indiscriminately below decks. Left undetected, such uncontrolled water may quickly fill the bilge, reach important electrical, mechanical, and engine components, and seriously compromise the safety of the watercraft and everyone aboard.

Components on either the intake or the outlet side of a pump can contribute to its working environment—the effective input restriction against which it must create suction to draw in water, and the effective output backpressure against which it must pump that water to its destination. A loose hose between a Fill Pump (FP) and its associated ballast compartment, for example, will cause lower hydraulic backpressure (and thus lower CEMF) than should ever be encountered under normal conditions. With the systems and/or methods of the present disclosure storing the range of proper values for pump voltage and/or current under normal safe operating conditions, anomalous conditions can be detected by processing circuitry and brought to the attention of the watercraft operator through the visual and audible indicators already present. As an extra measure of safety, the present disclosure can optionally depower pumps with questionable safe operating characteristics until the operator takes notice, remedies the situation, and clears the warning.

A related advantage of embodiments of the present disclosure is its ability to detect and report failed pumps. Pumps have two primary failure modes: Open or shorted windings in the pump motor, and seized mechanisms due to bearing failure or debris jammed in the pump. Failed windings cause circuit conditions which the present disclosure can easily detect—if power is applied to a pump and there is anomolous current flow or voltage drop across the motor, the pump requires inspection. Similarly, seized pumps with intact windings do not begin rotation and do not develop CEMF, thus exhibiting a sustained high current condition easily detected by the present disclosure.

In addition to the ability to notify the operator that pump maintenance is required, embodiments of the systems and/or methods of the present disclosure can enhance safety by testing Drain Pumps (DP) before—and even occasionally during—filling the associated ballast compartment. It is dangerous to fill a ballast compartment whose Drain Pump (DP) is nonfunctional since there is then no prompt way to remove what is often thousands of pounds of weight from the boat. Existing ballast systems have no feedback mechanism with which to test pump condition and thus no way to protect against such failures, but embodiments of the present disclosure can provide this protection.

Another advantage of embodiments of the present disclosure is that pumps can be turned off when appropriate, thus preventing excessive useless runtime long after the associated ballast compartment has been filled or drained. Some pump styles, such as impeller pumps, have parts that wear based on their minutes of use with the wear becoming especially acute when the pump is run "dry" (i.e. after the ballast compartment is empty). The inconvenience and expense of maintaining such pumps can be substantially reduced by accurately and promptly depowering the pumps when their task is complete—something existing time-based ballast systems can only guess at, but which is an inherent capability of the present disclosure. And while other styles of pumps (centrifugal or so-called "aerator" pumps, for example) may not be as sensitive to run time, this capability of the present disclosure still pays dividends by preventing unnecessary power drain from onboard batteries.

Yet another advantage of embodiments of the present disclosure is its ability to be accurate and self-calibrating. Unlike systems based solely on a rough estimate of time, embodiments of the present disclosure actually determine and/or communicate when a ballast compartment is empty or full. Furthermore, the amount of time required to fill or empty a ballast compartment can be determined with certainty, with recalibration occurring with every fill or drain cycle and the results stored by processing circuitry. This can provide an increase in accuracy when recording and restoring a given set of ballast conditions, as will be expanded upon later in this description.

Another advantage of embodiments of the present disclosure is that extensive additional instrumentation is not necessarily required, such as level sensors within the ballast compartments themselves. Such in-tank "sending units" are a way to measure the fluid level in a compartment, but are notoriously expensive and unreliable and prone to all manner of faults and problems of their own.

Figure 3:
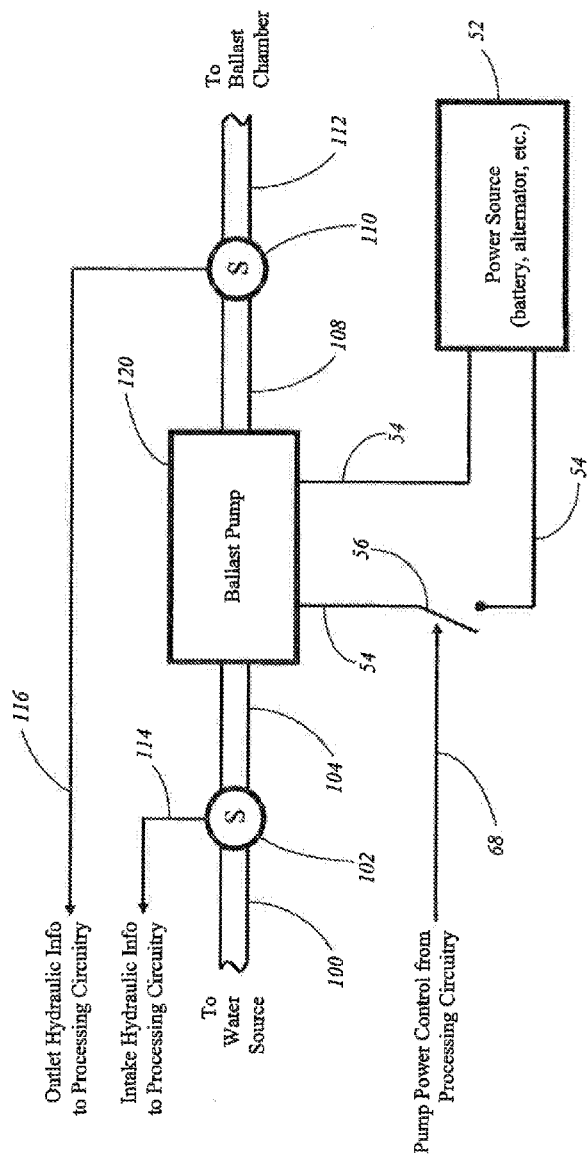
FIG. 3 is a block diagram of a ballast pump configured with intake and outlet hydraulic measurement.

If monitoring the pump motor voltage or current is inconvenient, similar data may be obtained by measuring hydraulic characteristics at the intake and outlet of the pump. FIG. 3 illustrates an alternative approach to monitoring the operating condition of a pump. Water from the source flows through connection 100 and suitably connects to a hydraulic sensor 102. From sensor 102, the water then flows through connection 104 to ballast pump 120. From the outlet of pump 120 the water flows through connection 108, to a second hydraulic sensor 110, and thence through connection 112 to the ballast compartment. For clarity, FIG. 3 shows hydraulic sensors at both the intake and an outlet of the pump; however, a single hydraulic sensor at the intake or outlet can suffice in many embodiments.

Sensors 102 and 110 in FIG. 3 may measure pressure, flow, or any other suitable characteristic of the water before or after pump 120. The choice of sensor and its location will be dictated by the specifics of each application.

FIG. 3 thus illustrates the ability to monitor the intake and/or outlet conditions of pump 120 via sensors 102 and 110. As operating conditions of pump 120 change, the information conveyed via signals 114 and 116 will change as well. For example, if pump 120 is a Fill Pump (FP) and the ballast compartment fills to capacity, the aforementioned increased backpressure will cause an increase in the outlet pressure, and a decrease of outlet flow, at the outlet of pump 120. Sensor 110 will make that information available via signal 116. Other environmental changes which would have had an effect on the CEMF, and thus the pump motor voltage or current, will have effects on the pump intake and outlet characteristics and be detectable by sensors 102 and 110 of FIG. 3. This information can then be used by processing circuitry to manage the application of power from power source 52 to pump 120, via control signal 68 and circuit interrupter 56.

FIGS. 2 and 3 thus illustrate how the present disclosure can monitor the conditions of a pump in a ballast system. By replicating this approach for some or all pumps, an entire ballast system can be managed by the present disclosure and its unique advantages can be realized for pumps and components throughout the system.

Figure 4:
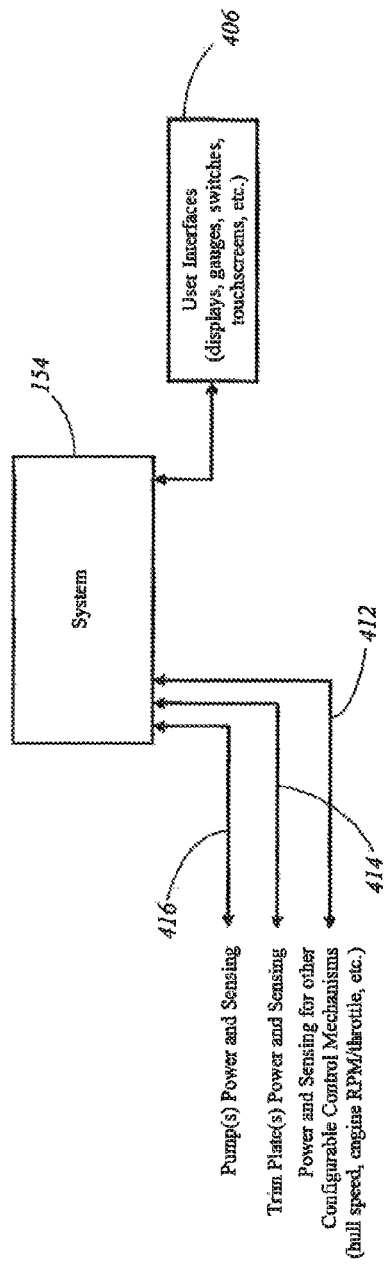
FIG. 4 is a block diagram of a wakeboat ballast control system with connections to associated components.

FIG. 4 illustrates one embodiment of the present disclosure wherein the pump monitoring advantages of FIGS. 2 and 3 are incorporated into a complete ballast control system. System 154 of FIG. 4 incorporates some of these control elements. In one embodiment, system 154 may include processing circuitry including microprocessors (such as the PIC18F25K80 microcontroller example mentioned above), logic, memories, programmable gate arrays or other field-configurable devices, and other digital electronic components. Such processing circuitry may also include analog circuitry including amplifiers, filters, digital-to-analog and analog-to-digital converters, and related components. System 154 may include electromechanical devices such as relays or their solid-state equivalents, switches, potentiometers, and similar components. System 154 may further include power supply and conditioning components and connectors for various cables and memory devices.

Analog or digital inputs may be configured with the processing circuitry of system 154 to allow various parameters to be monitored. As noted previously, analog inputs could be used to monitor voltage sensor 62 or current sensor 58 which provide information regarding the operational condition of the associated ballast pump and ballast compartments associated with the ballast pump. The processing circuitry of system 154 could also provide analog or digital outputs to operate controls, indicators, or other configurable devices. As just one example, such an output could be used to control circuit interrupter 56 of FIG. 3.

System 154 may interact with some or all of the various components, if present, on the wakeboat in question, including pump power and sensing via connection 416, trim plate power and sensing via connection 414, and power and sensing for other configurable control mechanisms such as boat speed and engine throttle/RPM 412. System 154 can also interact with user interfaces such as displays, gauges, switches, and touchscreens 406.

Figure 5:
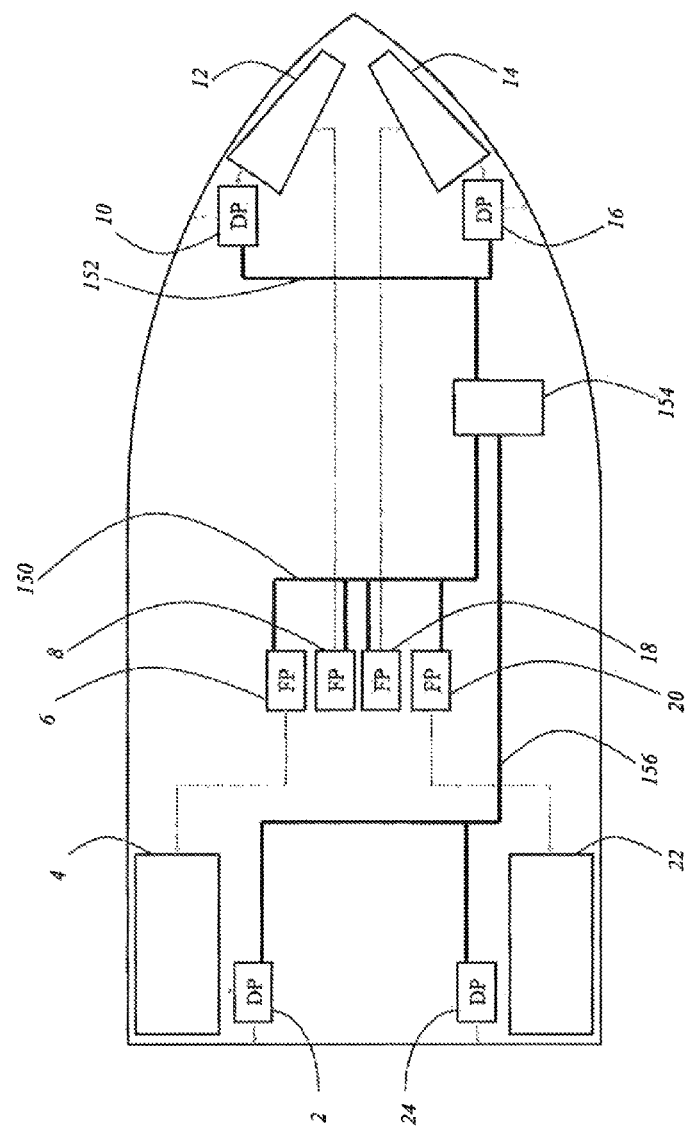
FIG. 5 illustrates the outline of a wakeboat hull with ballast compartments, ballast fill pumps, ballast drain pumps, a control module, and associated power and sensor connections.

FIG. 5 illustrates how one embodiment of the present disclosure might be deployed in a typical wakeboat, perhaps even retrofitted into an existing wakeboat with a traditional ballast system as illustrated earlier in FIG. 1. For convenience, FIGS. 1 and 4 share reference numbers for like items. FIG. 5 still has four ballast compartments 4, 12, 14, and 22; four Fill Pumps (FP) 6, 8, 18, and 20; and four Drain Pumps (DP) 2, 10, 16, and 24. Pump monitoring as described above and illustrated by FIGS. 2 and 3 would be installed as appropriate for each pump. FIG. 5 also adds system 154 of the present disclosure which receives motor voltage information via signal 66 in FIG. 2, and the motor current information via signal 64 in FIG. 2, for the several Fill Pumps (FP) and Drain Pumps (DP) in the system. If the hydraulic sensing of FIG. 3 is used, system 154 of FIG. 5 receives intake information via signal 114 of FIG. 3 and outlet information via signal 116 of FIG. 3.

That portion of circuit 54 which conveys power to pump motor 60, as illustrated in FIGS. 2 and 3, passes through connections 150, 152, and/or 156 of FIG. 5 as appropriate for each pump. In an embodiment using the hydraulic sensing of FIG. 3, signals 114 and 116 of FIG. 3 also pass through connections 150, 152, and/or 156 of FIG. 5 as appropriate for each pump. The wiring associated with each pump, or group of pumps, can be optionally grouped together to ease installation and routing.

FIG. 5 shows system 154 located approximately in the traditional location of the operator console on most watercraft. Since the present disclosure can incorporate or integrate with numerous operator controls and indicators, this is likely to be a convenient central location. However, it is to be understood that the present disclosure is in no way required to be located in a specific location. Furthermore, different embodiments may benefit from separating various subsystems of the present disclosure and locating them independently at different locations about the vessel. As a specific example, voltage sensor 62 of FIG. 2 and current sensor 58 of FIG. 2 for each motor may be located within system 154 itself and are not required to be located physically near the pump in question. The specifics of connections 150, 152, and/or 156 may also vary as dictated by each installation and any functionally equivalent arrangement is considered the same for purposes of this description.

Referring again to FIG. 5, system 154 is connected to the various pumps of the ballast system via connections 150, 152, and 156. In this manner the specifics of FIGS. 2 and 3 can be implemented at each pump despite the disparate locations of the various pumps and their physical distances from system 154. Thus system 154 has the ability to control power to each pump; sense voltage or current for each pump; sense intake and outlet hydraulic conditions for each pump; and integrate the advantages of the present disclosure into an existing ballast system if present.

While not explicitly illustrated, some embodiments of the present disclosure can support multiple pumps performing a common task, sometimes referred to as "paralleled pumps". Some embodiments can also support additional pumps used for "cross pumping" between ballast compartments to take advantage of ballast water that is already on board.

Figure 6:
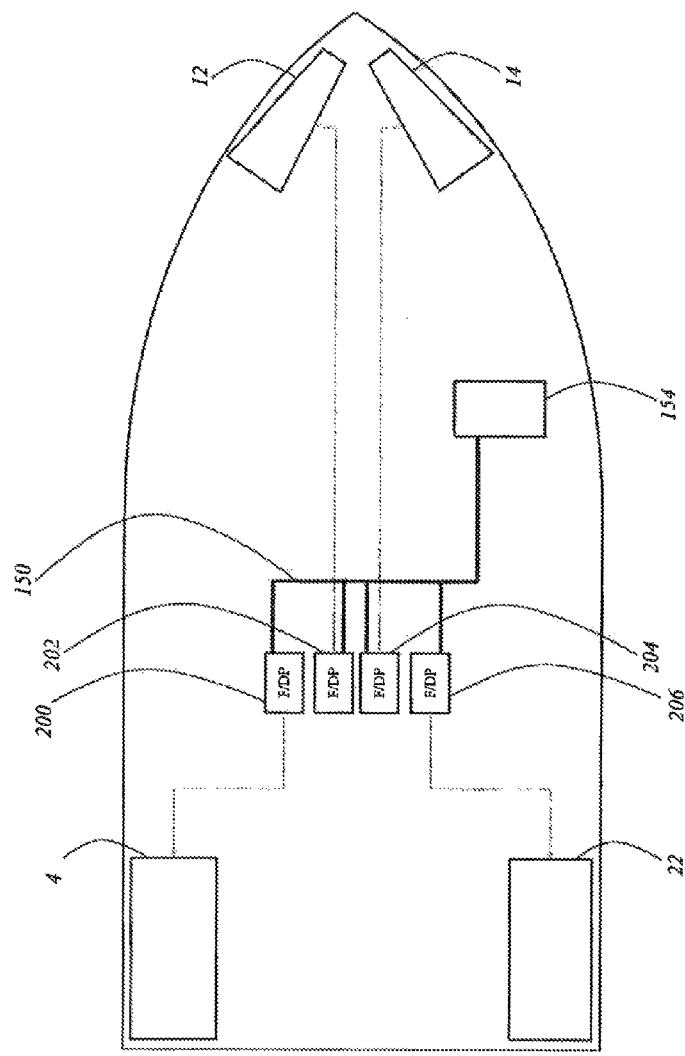
FIG. 6 illustrates the outline of a wakeboat hull with ballast compartments, ballast fill/drain pumps, a control module, and associated power and sensor connections.

FIG. 6 illustrates another embodiment of the present disclosure—one which uses a single Fill/Drain Pump (F/DP) for each ballast compartment. Some types of pumps can be used bidirectionally to pump water in either direction depending upon how power is applied to the pump motor. In this embodiment, the eight separate pumps of earlier figures are replaced by four Fill/Drain Pumps (F/DP) 200, 202, 204, and 206 which are centrally located. The pumps are connected to system 154 via connection 150. It is to be noted that FIG. 5 is just one example of an embodiment of this type, and that there is no inherent requirement for the pumps to be co-located or to share connection 150. The present disclosure can be compatible with such shared-pump systems and the principles disclosed herein may be applied without limitation.

Figure 7:
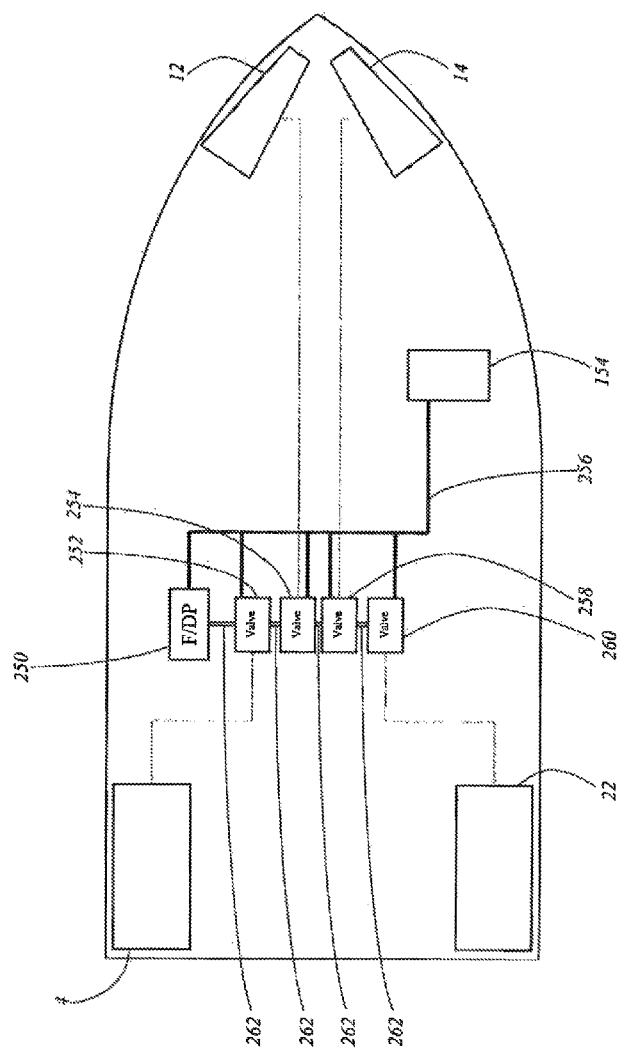
FIG. 7 illustrates the outline of a wakeboat hull with ballast compartments, a ballast fill/drain pump, ballast valves, a control module, and associated power and sensor connections.

FIG. 7 illustrates yet another embodiment of the present disclosure. Here, a single bidirectional Fill/Drain Pump (F/DP) 250 is used in place of multiple individual pumps. Reducing the pump quantity can allow for the use of a much larger, more powerful, and higher volume single pump, shortening fill and drain times when a subset of all ballast compartments are to be used. Routing of water to and from specific ballast compartments is achieved via valves 252, 254, 258, and 260 which system 154 can selectively open and close via connection 256, which may optionally be shared with connections for pump 250. One water port of pump 250 is connected to all four valves 252, 254, 258, and 260 via a manifold 262, and the other side of each valve is then connected to its associated ballast compartment. As shown in FIG. 7, valve 252 thus controls water flow to and from ballast compartment 4; valve 254 controls water flow to and from ballast compartment 12; valve 258 controls water flow to and from ballast compartment 14; and valve 260 controls water flow to and from ballast compartment 22. System 154 can thus control pump 154 and valves 252, 254, 258, and 260 to fill or drain any quantity and combination of ballast compartments simultaneously, though the speed advantage of this architecture is best realized when a single ballast compartment is to be filled and drained.

The preceding discussion describes embodiments of the present disclosure interfacing pumps and ballast compartments in a wakeboat ballast system. FIG. 8 will be used to illustrate how a watercraft can be affected and controlled utilizing embodiments of the disclosure. For reference, the axis of rotation running from front to rear can be referred to as a watercraft's longitudinal axis. The axis of rotation running from left to right can be referred to as a watercraft's lateral axis. The axis of rotation running vertically from above to below can be referred to as a watercraft's yaw axis. The terms longitudinal, lateral, and yaw will be used accordingly herein.

FIGS. 8A-8F illustrate the effects of various ballasting configurations on the hull of a watercraft. FIG. 8B shows a boat 352 in a body of water with no (or symmetrical) side-to-side ballast. As shown in FIG. 8B, boat 352 has approximately zero degrees of tilt on its longitudinal axis. It is approximately level in the water.

In contrast, FIGS. 8A and 8C illustrate the effect of asymmetrical ballast. Boat 350 in FIG. 8A is shown floating in water with ten degrees of tilt to its port (left) side. Such a tilt might be caused by filling the aft (rear) ballast compartment on that side while leaving the opposite ballast compartment empty. To be more specific, this tilt might be caused by filling ballast compartment 4 of FIG. 1 while leaving empty ballast compartment 22 of FIG. 1. All of the ballast weight would be concentrated on the port (left) side, causing boat 350 in FIG. 8A to rotate "counterclockwise" around its longitudinal axis, with the amount of rotation or tilt dependent upon the asymmetry of the weight distribution within the hull.

The opposite effect is shown in FIG. 8C. Now, boat 354 is tilted ten degrees to its starboard (right) side as a result of filling the starboard aft (right rear) ballast compartment. Referring again to FIG. 1, this might correspond to filling ballast compartment 22 while leaving ballast compartment 4 empty. Boat 354 of FIG. 8C is thus rotated "clockwise"

around its longitudinal axis—again, with the amount of rotation or tilt dependent upon the asymmetry of the weight distribution within the hull.

FIGS. 8D through 8F illustrate rotation around the watercraft's lateral axis. Beginning with FIG. 8D, boat 356 is shown floating in water at what might be its "normal" lateral position (that is, without being affected by ballast). As rear ballast compartments 4 and 22 of FIG. 1 are filled, the rear of the boat begins to sink deeper into the water. Boat 358 of FIG. 8E shows a three degree rotation around the lateral axis, with the stern (rear) of the watercraft hull deeper in the water and the bow (front) of the watercraft beginning to rise higher out of the water. FIG. 8F illustrates what may occur if rear ballasting continues to an extreme point: The stern (rear) of boat 360 is now almost completely submerged, while its bow (front) has risen far out of the water.

To offset this lateral rotation, ballast compartments 12 and 14 of FIG. 1 could be filled to shift the weight balance forward. The resulting relative increase of front-to-rear weight would cause the boats in FIGS. 8E and 8F to have reduced rotations around their lateral axes. For example, if boat 360 in FIG. 8F had zero ballast in its front ballast compartments, filling those front ballast compartments would add weight to the front of the boat and rotate the hull in the opposite direction around its lateral axis, so that it would begin to approach the tilt of boat 358 in FIG. 8E. If the front ballast compartments are of sufficient capacity, it might be possible to add enough ballast to return to the normal, unballasted lateral rotation shown in FIG. 8D.

However, restoring normal rotation angles around the longitudinal and lateral axes does not necessarily mean that the watercraft has been restored to its unballasted condition. The extra ballast weight will cause the watercraft to displace additional water; in other words, the watercraft will ride lower in the water. The nautical term for the depth of a hull in water is "draft". The hull's draft plays an important role in the shape and performance of the wake produced behind it, just as do the longitudinal and lateral rotation angles. The same hull with the same angles of rotation, but at two different drafts, will produce two different wakes. Indeed, changing any of the three variables—longitudinal angle, lateral angle, and draft—will affect the resulting wake.

When optimizing the wake for a particular watersports participant, and especially when seeking to reproduce wake conditions achieved at some time in the past, the entire relationship between the hull and the body of water in which it is moving must be taken into account. The behavior of the wake is primarily controlled by how the hull displaces the water, which is in turn controlled by the draft and angle of the wakeboat hull in the water. Existing wakeboat ballast systems do not address this critical point. It is not sufficient for existing wakeboat ballast systems to simply remember approximately how much ballast was in each ballast compartment, and then attempt to restore those levels using grossly inaccurate estimates based on pump runtime. Hull attitude is affected by many factors beyond just the fill levels of each ballast compartment, including but in no way limited to the amount of fuel onboard and the number, position, and weight of passengers. Worse, these factors can and do change in real time such as when passengers embark and disembark or move around within the wakeboat, or fuel is consumed or refilled during a day's operation.

As noted previously, watersports are often a very social event. Passengers come and go during a single outing. Even changing the current watersport participant (say, from a heavier to a lighter wakeboarder) alters the amount and distribution of weight in the hull. All of this may involve small children to large adults. These very natural occurrences cause multi-hundred pound changes in weight distribution, corresponding substantial changes in hull angles and draft, and thus significant variability in the wake produced. Existing ballast systems do not account for these dynamics and instead focus on roughly restoring an amount of water in each ballast compartment as if that alone is sufficient to reproduce desired wake behavior.

Earlier ballast systems mistakenly attempted to focus on ballast amounts, but what really affects wake behavior is the relationship of the hull to the water. A proper wakeboat ballast system must measure and monitor the behavior of the hull. Pumps, ballast compartments, and amounts of water are not the end but the means. They are simply tools to be used to achieve the actual goal of hull control.

The preceding discussion has illustrated that varying amounts of ballast in various locations affect how the hull of a boat interacts with the water in which it is floating, and how embodiments of the present disclosure can improve upon existing pump and ballast management. These improvements are significant advancements of the art.

FIG. 4 depicts an embodiment of the present disclosure relating to pump monitoring, pump control, error sensing, operator notification and interaction, and the like. FIG. 4 represents a fully operational ballast control system that is a significant improvement over the existing art.

Figure 9:
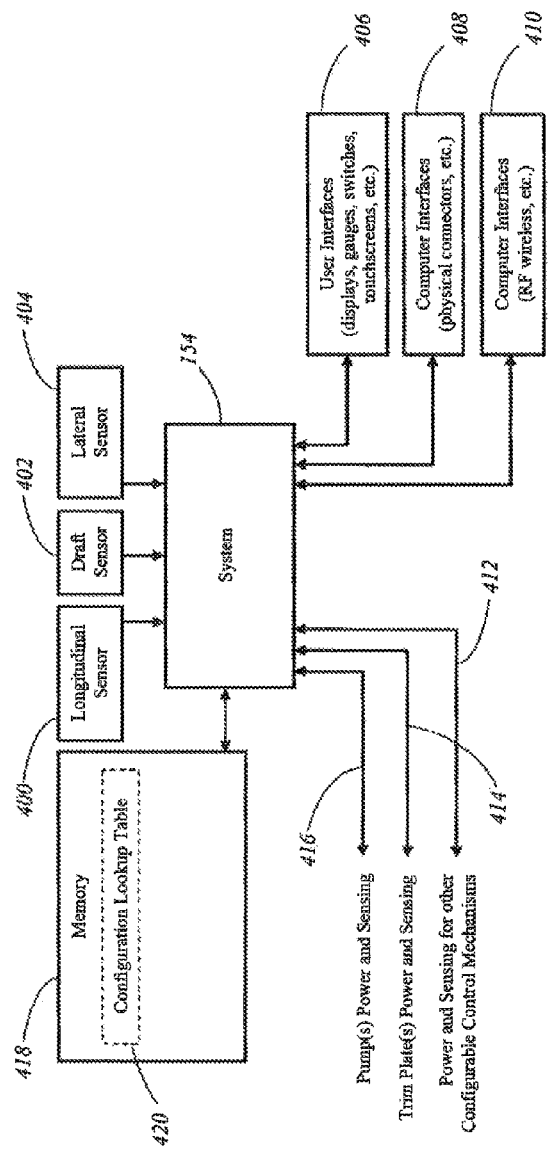
FIG. 9 is a block diagram of a wakeboat ballast control system with a configuration lookup table and connections to associated components.

FIG. 9 illustrates another embodiment of the present disclosure relating to hull control. System 154 is still present, together with its connections to pump power and sensing 416, trim plate power and sensing 414, power and sensing for other configurable control mechanisms such as boat speed and engine throttle/RPM 412, and user interfaces such as displays, gauges, switches, and touchscreens 406.

FIG. 9 also depicts sensors that measure the orientation of the wakeboat hull. In one embodiment, the sensor type can be an inclinometer (the word "clinometer" is sometimes used and is considered equivalent herein). An inclinometer is a device which measures rotation around an axis. The output of an inclinometer can be visual (as in a handheld device for direct human use), mechanical, electrical, or any other communication methodology appropriate for the specific application. Recent advancements in integrated circuit fabrication techniques, particularly microelectronic machining (or MEMS), have resulted in the availability of inclinometers packaged in a single component which can be incorporated into electronic devices. The inclinometer could be, for example, an ADIS16203 (Analog Devices Inc, One Technology Way, Norwood Mass., 02062, United States) or another whose characteristics suit the specific application. The sensor type can also be an accelerometer such as the ADXL330 (Analog Devices Inc, One Technology Way, Norwood Mass., 02062, United States) or another whose characteristics suit the specific application. Accelerometers deliver inclination data while also providing dynamic acceleration data resulting from motion—often at no more cost than a pure inclinometer. A further advantage of accelerometers is that they are increasingly included in common handheld devices such as cellphones, resulting in the dramatic reductions in cost and increases in quality and performance delivered by the economies of scale. In this document, it is to be understood that the term "inclinometer" may refer to the use of an accelerometer in addition to a purpose-built inclinometer.

It is to be further understood that the functions of longitudinal inclinometer 400 and lateral inclinometer 404 may be derived from other sensors. As just one example, it may be more convenient for a watercraft manufacturer to install accelerometers and/or inclinometers without precise alignment to the actual axes of the hull. Those with ordinary skill in the art will recognize that data from such misaligned sensors can be manipulated using well known techniques to mathematically correct for such misalignment, yielding functionally the same results as would have been obtained from aligned sensors. It is an advantage of the present disclosure to employ such techniques to ease the installation and/or use of sensors on board a watercraft.

Continuing with FIG. 9, one embodiment of the present disclosure incorporates a single sensor 400 to measure an orientation of the hull—in this specific example, its rotation around its longitudinal axis. Sensor 400 monitors the longitudinal angle of the hull and provides this information to system 154. System 154 and its processing circuitry thus receive measurements from the first sensor, and can monitor the longitudinal angle of the hull. Furthermore, since system 154 and its processing circuitry is coupled to ballast pumps via connection 416 and trim plates via connection 414, system 154 can also optionally operate the ballast pumps and trim plates. System 154 and its processing circuitry can be configured to make changes to trim plate parameters and the amounts of ballast in ballast compartments to seek and maintain a desired longitudinal angle of the hull.

Unlike existing ballast systems, this single-sensor embodiment of the present disclosure is not limited to managing the wakeboat ballast system based on amounts of water in various ballast compartments. Instead, with a single longitudinal sensor this embodiment of the present disclosure can manage the ballast system (and other parameters if present) to achieve a desired longitudinal hull angle.

Furthermore, this embodiment of the present disclosure can record, recall, and restore desired longitudinal hull angles. When a desirable wake configuration is achieved, system 154 of FIG. 9 can accept a command from user interface 406 to record its current configuration in a configuration lookup table 420 residing in a memory 418. While parameters such as trim plate settings and ballast amounts in various ballast compartments may be recorded, this embodiment of the present disclosure can also record the longitudinal angle of the boat. Multiple such configuration entries may be stored by system 154 in memory 418, optionally associated with mnemonically convenient labels such as the names of participants, the type of wake thus produced, notable characteristics such as time and date, and other information.

Once stored in memory 418, such configurations may be recalled by system 154 in response to commands from user interface 406. System 154 can then restore the various parameters to return the wakeboat to the same condition as the selected configuration. As noted above, however, the stored parameters may not yield the exact same configuration due to changes in weight distribution and other factors. Therefore, when restoring and maintaining a selected configuration, system 154 can monitor sensor 400 for differences in the longitudinal angle of the boat and make adjustments to those parameters over which it has control to accommodate changes.

For example, if this single-sensor embodiment of the present disclosure notices that the longitudinal angle is too far to the right (starboard), system 154 of FIG. 9 can turn on drain pump 24 of FIG. 1 to reduce the amount of weight in ballast compartment 22. For even more impact, system 154 of FIG. 9 can simultaneously turn on fill pump 6 of FIG. 1 to increase the amount of weight in ballast compartment 4. These actions would result in a shift of weight distribution toward the left (port) side. When sensor 400 of FIG. 9 reports that the desired longitudinal angle has been achieved, system 154 can turn off the pumps and continue to monitor sensor 400 of FIG. 9 in the event that additional corrective action is required.

Referring back to an earlier example, a 200 pound passenger moving from one side of the passenger compartment to the other would cause a change in the longitudinal angle. System 154 of FIG. 9 would become aware of that change via data from longitudinal sensor 400 and could automatically restore the desired longitudinal angle by controlling the ballast pumps as described.

Likewise, an exchange of watersport participant—and the resulting weight shift if the participants are of differing weights—could be accommodated autonomously. Indeed, the present disclosure can accommodate changes regardless of their cause, intentional or not, and do so entirely automatically.

If desired, system 154 of FIG. 9 could notify the wakeboat operator via user interface 406 when conditions have changed or when system 154 believes adjustments to accommodate such changes are required. Optionally, system 154 could wait for operator confirmation before proceeding with such adjustments, or wait a configurable amount of time before automatically proceeding with the changes in the absence of overt confirmation.

It should be noted that a multitude of factors may cause transient changes to monitored parameters such as the longitudinal angle of the boat. Gusts of wind, waves at odd angles, momentary passenger relocations, and similar temporary events may cause changes that need not be immediately accommodated. Indeed, in highly dynamic environments the information provided by the present disclosure's sensors may require a variety of filtering techniques to eliminate extraneous content. For example, if the body of water in which the boat floats is not calm, the longitudinal sensor 400 of FIG. 9 may indicate repeated minor fluctuations in longitudinal angle that need not—indeed should not—be accommodated. To address this specific example, system 154 might incorporate a low pass filter, apply an averaging algorithm, or otherwise modify the information received from longitudinal sensor 400 to retain just the necessary content. A broad spectrum of filtering techniques for a wide range of possible conditions may be supported by the present disclosure and be realized programmatically, electrically, mechanically, or by any approach as suited to the specifics of the embodiment in question.

Continuing with FIG. 9, another embodiment of the present disclosure adds a second sensor 404 to measure the angle of the boat around a second axis—in this specific example, its lateral axis. Sensor 404 monitors the lateral angle of the boat and provides this information to system 154. In combination with the aforementioned longitudinal sensor 400, this two-sensor embodiment of the present disclosure enables system 154 to record, recall, and restore desired hull angles for both axes that affect wake performance. All of the features and capabilities of the single-sensor embodiment described above are retained and enhanced by the addition of lateral sensor 404. System 154 is thus enhanced with the ability to record, recall, and restore conditions relating to the lateral angle in addition to those relating to the longitudinal angle, and use that information to control the ballast pumps as described earlier for the single sensor embodiments.

In one embodiment, the second sensor could be a second inclinometer used in the example above. In another embodiment, the two inclinometers could be integrated into a single device to reduce parts count and simplify processing circuitry design and construction. Such a dual axis inclinometer could be, for example, an ADIS16209 (Analog Devices Inc, One Technology Way, Norwood Mass., 02062, United States) or another whose characteristics suit the specific application.

The longitudinal and lateral axes are illustrated in the present embodiments for convenience of illustration and explanation. Other axes besides the longitudinal and lateral axes may be used in different embodiments of the present disclosure. Other sensor types may also be advantageously used; for example, system 154 could derive hull rotation from the measurements of typical marine draft sensors, correlating changes in hull tilt to changes in draft depth as the waterline changes at various locations on the hull. Multiple quantities, arrangement, and alignment of sensors may be used to achieve the advantages of the present disclosure.

A further embodiment of the present disclosure adds a draft sensor 402 to measure the depth of the hull below the water surface. Sensor 402 does not measure the depth of the water, but the draft—the depth of the boat hull in the water. As noted previously, it is possible to achieve the same longitudinal and lateral hull angles while the hull sits at different depths in the water. A lightly loaded hull will displace less water and float shallower, while a more heavily loaded hull will displace more water and float deeper, and yet both conditions may be achieved with identical longitudinal and lateral angles. The amount of water displaced by the hull is an important factor in wake development behind the boat, and in the most advantageous embodiment of the present disclosure, draft sensor 402 enables this third degree of freedom to be included in system 154's control of the ballast pumps, and thus its management of the wakeboat ballast control system.

An example will help in understanding the advantage and importance of draft sensor 402. Presume that the earlier two-inclinometer embodiment of the present disclosure recorded a desired configuration when the boat was lightly loaded. At some later time, that configuration is recalled and system 154 of FIG. 9 is instructed to restore that configuration—except that at this later time more passengers are on board and the boat is thus more heavily loaded. System 154 may indeed restore the desired longitudinal and lateral hull angles, but lacking knowledge of the increased weight the result may be that the hull floats much higher or much lower in the water. A different draft means different displacement, which means the resulting wake may be substantially different from what was last produced with the recalled configuration, despite identical longitudinal and lateral hull angles.

Some two-inclinometer embodiments of the present disclosure may offer manual adjustment of draft. If the wakeboat operator notices that the hull is floating higher or lower than desired, user interface 406 of FIG. 9 could be used to instruct system 154 to adjust ballast amounts up or down while maintaining the target longitudinal and lateral hull angles. In this manner, the human operator is closing the loop with respect to draft in the absence of draft sensor 402.

An embodiment of the present disclosure could be produced using a single inclinometer to monitor a single axis, and in many cases this will be sufficient as it represents an enormous improvement over the existing art. Another embodiment of the present disclosure could be produced with two inclinometers to monitor both the longitudinal and lateral axes. A further improvement would include both inclinometers and the draft sensor to monitor all three degrees of freedom that affect how the hull interfaces with the surrounding body of water.

Inclinometers are not the only way to measure how the hull interacts with the surrounding water. Another embodiment of the present disclosure uses multiple draft sensors mounted at different locations on the hull. For a given axis of rotation, the placement of a draft sensor away from the axis in question yields differing draft measurements that correlate to different amounts of hull tilt around that axis. An embodiment of the present disclosure that deploys two draft sensors can thus derive tilt information for two axes. An advantage of this embodiment is that the separate measurements from these same draft sensors can themselves be correlated to yield an overall hull draft measurement without requiring a third sensor.

Some embodiments of the present disclosure may permit a single or dual sensor installation to be later upgraded by the installation of additional sensors. This would permit an entry-level embodiment of the present disclosure to be initially affordable to a greater number of wakeboat purchasers, and allow them to upgrade as their circumstances permit. This concept could be expanded to allow the present disclosure to be deployed on wakeboats having only rudimentary hull control implements; for example, at first a boat may have only trim plates and no formal ballast system. Despite the lack of a ballast system, a wakeboat having only trim plates nevertheless does have some limited ability to modulate its hull behavior and the present disclosure could take best advantage of whatever capabilities currently exist on the boat in question. Another example would be the addition of trim plates to a wakeboat initially lacking them, or the enlargement of ballast compartments from factory stock to a custom version. When hull control implements are added or changed, the present disclosure could be connected to them and then deliver improved performance.

FIGS. 8G through 8H and 8J illustrate rotation around the watercraft's yaw axis. The yaw axis differs from the longitudinal and lateral axes in that yaw rotation is measurable or meaningful when the hull of the wakeboat is in motion. While the longitudinal and lateral orientation of a motionless hull can be measured relative to the surrounding water. Hulls having a direction of movement can provide a reference for yaw angle measurements.

The yaw angle of the hull can be the relationship between the direction the hull is moving and the direction the hull is "pointing", i.e. its "heading", or the longitudinal axis of the hull. Intentional rotation of the hull of a watercraft about its yaw axis can normally be controlled by the rudder, a rotatable vertical "fin" which extends into the water near the rear of the hull. Absent other forces applied to the hull, such intentional rudder-induced rotation may result in the hull describing an arc in the water, i.e. "turning" instead of "going straight".

Referring to FIG. 8H, boat 364 is shown with the longitudinal axis 368 of its hull (i.e. its heading) in alignment, or parallel, with the direction of travel 370. This can represent zero degrees of rotation about the yaw axis.

Now consider what happens when a rotational force is applied to the hull of a moving watercraft. Left unchecked, a rotation of the hull would result in the hull turning in the direction pointed to by its bow (front). But since most watersports associated with wakeboats prefer the hull to travel in a straight line, the operator of the watercraft has compensated for such rotational forces by turning the rudder to keep the hull traveling straight.

The combination of these forces—those acting to rotate the hull on its yaw axis, and a response by the operator of turning the rudder to keep the hull moving in a straight line—can yield a divergence of the direction of hull travel with the orientation of the hull about its yaw axis. FIG. 8G illustrates one example of this condition. Hull 362 is experiencing a rotational force that turns hull 362 toward its port (left) side, and a compensating force from the rudder that keeps hull 362 moving in a straight line. The result in this example is five degrees of rotation on its yaw axis toward its port (left) side, resulting in a divergence of the heading of the hull 368 from the direction of travel 370.

Rotation on the yaw axis of a watercraft can occur in either direction. FIG. 8J illustrates the effect of a rotational force that turns hull 366 to the starboard (right) side, together with a compensating force from the rudder. The result in FIG. 8J is five degrees of rotation on the yaw axis in the opposite direction, toward the starboard (right) side, again resulting in a divergence of the longitudinal axis of the hull 368 from the direction of travel 370.

Yaw axis rotation is a fourth parameter that—together with the aforementioned longitudinal rotation, lateral rotation, and draft—can also affect the wake produced by the hull of a wakeboat. Devices intended to control the wake created by the hull of a wakeboat can also have an effect on the yaw angle of the hull. For example, port (left) trim plate 28 and starboard (right) trim plate 24 of FIG. 1 can have a significant impact on the nature of the yaw angle of the hull, and thus on the wake created by the hull of the wakeboat.

Referring to FIG. 8H, when trim plate 24, trim plate 26, and trim plate 28 are not touching the water, they have little to no effect on the orientation of hull 364. In this circumstance the trim plates have minimal effect on the rotation of the hull about its yaw axis. Again referring to FIG. 8H, the direction of hull motion 370 can be approximately parallel with the longitudinal axis 368 (i.e. the "heading", or the direction the hull is "pointing") of hull 364.

When the trim plates begin to touch the water for example, they introduce drag. The effect of this drag on the hull of the wakeboat can be affected by many factors associated with the trim plate including but not limited to its mounting location and method on the hull, its shape, its size, and its angular orientation (i.e. how horizontal or vertical it is).

In some applications the drag induced by trim plates may actually yield a desired benefit. For example, deploying a trim plate which is mounted to one side of the centerline of the hull may permit some control over hull rotation about its longitudinal (or "roll") axis, and deploying a trim plate which is mounted on the centerline of the hull may permit some control over hull rotation about its lateral (or "pitch") axis. Use of trim plates to control hull orientation about the longitudinal and lateral hull axes has already been discussed elsewhere herein. As desirable these primary effects may be, the secondary effects incurred have not been addressed by the prior art.

FIG. 8G illustrates one of those secondary effects. When trim plate 28 just touches the water, its effect is minimal. But as the interaction of trim plate 28 with the water increases, the drag on the port (left) side of hull 362 induced by trim plate 28 also increases. This slows the port (left) side of hull 362 relative to the starboard (right) side, causing hull 362 to rotate about its yaw axis.

Left unchecked, the rotation of hull 362 in FIG. 8G can result in hull 362 turning to the left with its forward motion describing an arc instead of the straight line of FIG. 8G. But since most watersports associated with wakeboats prefer the hull to travel in a straight line, the operator of the wakeboat usually compensates with the rudder to keep hull 362 proceeding straight.

Instead of the parallel relationship of FIG. 8H, FIG. 8G illustrates how increased drag on the port (left) side of hull 362, combined with rudder compensation by the operator of the wakeboat can cause a divergence of the heading, or orientation of the hull about its yaw axis 368, with the direction of hull motion 370. This divergence can be referred to as "yaw angle", "side slip", and "Angle of Side Slip" or "AOSS", for example.

FIG. 8H illustrates a yaw angle of zero degrees. FIG. 8G illustrates a yaw angle of five degrees to port (left), meaning that the bow (front) of the hull 362 of the wakeboat appears to be pointed to the left as might result of trim plate 28 inducing drag in the water. Likewise, FIG. 8J illustrates a yaw angle of five degrees to starboard (right), meaning that the bow (front) of the hull 366 of the wakeboat appears to be pointed to the right as might result from trim plate 24 inducing drag in the water.

Devices other than trim plates can induce yaw rotation as a primary or secondary effect. However, use of trim plates or other hull control devices in accordance with embodiments of the disclosure may compensate for other sources of yaw rotation. Such control of yaw rotation—whether to correct for it, or maintain it at a desired angle—is a key advantage of certain embodiments of the present disclosure.

It is also important to note that yaw rotation is not always undesirable. Indeed, yaw rotation can play a key role in the creation and management of the wake behind the hull of the wakeboat. As just one example, intentionally inducing yaw rotation may provide a competitive alternative to proprietary wake enhancement methods and devices employed by some wakeboat manufacturers. As an example, it is the hull itself which, by displacing water, can cause the wake to be created. Changing the nature of that displacement can change the nature of the wake, and yaw rotation can have a significant effect on the wake so produced. Measuring, controlling, and maintaining the yaw angle of the hull of the wakeboat is just one advantage of the present disclosure.

Beyond the displacement of the hull itself, proprietary wake enhancement devices and methods can be susceptible to changes in hull orientation. The effects of trim plates, water diverting or redirecting devices, and other such accessories are dramatically affected when their depth in or angle relative to the water changes, such as results from changes in hull orientation or draft.

For example, the performance and behavior of a device meant to redirect water passing by the hull of a wakeboat can be significantly affected by changes to its depth in the water, or the angle at which the device engages the water—both of which can be affected by the yaw angle of the hull.

Proper measurement and control of yaw rotation, and the resulting yaw anglecan provide for repeatability of quality wakes for wakesport activities. The state of the art is deficient in its ability to measure, and control, the yaw angle of the hull of a wakeboat. Several embodiments of the present disclosure provide significant improvements in this area.

As noted above, measurement of the yaw angle is meaningful when the watercraft is moving. Sensing techniques are provided that are active when the hull is moving. While the present disclosure can employ many yaw angle measurement techniques as part of its unique and innovative hull control systems and methods, several embodiments of the present disclosure also offer significant new improvements in yaw angle measurement itself.

One traditional yaw angle sensing technique involves the use of a "fin" like appendage rotatably mounted to the hull, wherein the fin appears and acts in moving water much like a weathervane does in moving air. When the hull is in motion, the fin naturally aligns itself with the direction of the passing water. Since the longitudinal axis of the hull is known, the yaw angle is thus the angular difference of the fin away from that longitudinal axis.

Fin-style yaw sensors can be used in combination with some embodiments of the present disclosure to obtain the yaw angle of the hull. Fin-style yaw sensors can suffer from the same problems as any underwater movable object mounted on the hull. Water intrusion from the required hull penetrations, physical damage from impact, corrosion, the costs of installation and ongoing maintenance all detract from the desirability of measuring the yaw angle with a fin-style sensor.

An alternative to fin-style sensors can be to deploy pressure transducers on either side of the watercraft hull. This technique relies on the fact that when the heading and direction of motion are parallel as in FIG. 8H, the pressure on the two sides of the hull 364 can be generally equal. In contrast, if the hull has a nonzero yaw angle, a pressure differential will exist between the two sides of the hull and this pressure differential can be correlated to the yaw angle of the hull.

In FIG. 8G, for example, hull 362 is yawing to port (left) and thus the starboard (right) side of the hull is more "leading" into the oncoming water. Pressure sensors on the starboard (right) side of hull 362 would measure an increase in pressure relative to that experienced by the situation depicted in FIG. 8H. Similarly, the port (left) side of hull 362 in FIG. 8G is more "trailing" from the oncoming water, and thus pressure sensors on the port (left) side of hull 362 would experience a decrease in pressure relative to that experienced by the situation of FIG. 8H.

Pressure-based yaw angle sensing overcomes certain disadvantages of fin-style sensors, and once again some embodiments of the present disclosure can use them if desired. However, the problems of hull penetration and water intrusion still exist, and are in fact multiplied by the need for multiple pressure sensors to measure pressure at multiple locations on the hull. Cost is another disadvantage: Accurate water pressure sensors are expensive, and the need for several sensors rapidly escalates the cost of this technique.

The present disclosure offers multiple improvements upon past techniques for measuring yaw angle. One embodiment of the present disclosure measures forces acting upon the control surfaces of the watercraft. For example, in the earlier example of FIG. 8J, trim plate 24 is engaging the water and inducing drag. If trim plate 24 were acting alone, it would experience a given amount of force that could be measured by the present disclosure using a strain gauge or another type of sensor applicable to the specific implementation. But when the operator applies a corrective steering force to the rudder, resulting in the divergence of hull heading 368 from the direction of hull motion 370 as depicted in FIG. 8J, trim plate 24 will experience a change in the force applied to it as the effect of the rudder seeks to offset the effect of trim plate 24 on the direction of hull motion 370. Likewise, the rudder will experience a force opposing the corrective input from the operator since its natural tendency is to align itself with the passing water. Such changes in net forces experienced by the watercraft's control surfaces can be measured by the present disclosure and correlated to derive the yaw angle of the hull. A distinct advantage of this technique is that no additional hull penetrations nor external components are required; the present disclosure cleverly uses existing control surfaces to detect the forces affecting the hull.

Another embodiment of the present disclosure takes advantage of the availability of Global Positioning Satellite (GPS) equipment on some watercraft. GPS "track" data (i.e. the direction of hull motion) can be correlated by the present disclosure with the longitudinal axis of the hull to derive the yaw angle. If available, the present disclosure can also use GPS "heading" data (i.e. the direction the hull is pointing) together with GPS track data to calculate the yaw angle. In this manner, the present disclosure improves upon existing techniques by eliminating the need for hull penetrations and the subsequent risk of water intrusion. This technique of the present disclosure also decreases cost, by leveraging the sensors that are already available on watercraft in a new and novel manner instead of requiring additional sensor types dedicated to the specific task of yaw angle detection.

Yet another embodiment of the present disclosure takes different advantage of existing sensors. As shown in FIG. 9, longitudinal inclinometer 400 and lateral inclinometer 404 can also provide linear acceleration data if sensors 400 and 404 are realized using accelerometers as described elsewhere herein. System 154 can thus have information regarding both rotation about, and acceleration along, the longitudinal and lateral axes of the hull.

A watercraft moving at a perfectly constant speed experiences no acceleration. Such a condition cannot be differentiated by accelerometers from a watercraft at rest; while the former is moving and the latter is sitting still, neither is experiencing a change in velocity which is the figure of merit measured by accelerometers.

However, a moving watercraft seldom, if ever, moves at a constant speed for any length of time. The decelerating force of water friction can be overcome by the propulsive system of the watercraft, and this decelerating friction is a very dynamic and unpredictable value which can lead to a near-constant variation in hull speed, as unpredictable changes in friction lead to unpredictable changes in hull speed.

Since nearly all watersports activities prefer the wakeboat to travel in a straight line at a constant velocity, these unpredictable variations in hull speed are a significant source of frustration and even discomfort for watercraft passengers and watersports participants. The presence on most wakeboats of some form of "cruise control"—a feature that correctively modulates the propulsive system faster than most human operators can react—confirms this near-constant variability in hull speed.

These near-constant changes in hull speed are generally considered an annoyance. Some embodiments of the present disclosure turn this liability into an asset by extracting useful data from these velocity changes and using that data to determine yaw angle as described below.

Two extreme cases are useful in beginning the discussion of this innovation of the present disclosure. For the first case, referring to FIG. 8H, hull 364 has no yaw angle. Longitudinal axis 368 and direction of hull motion 370 are approximately parallel. As the hull slows down due to friction, acceleration (which includes deceleration, a synonym for negative acceleration) is along the direction of hull motion 370 and, due to the parallelism illustrated in FIG. 8H, also along longitudinal axis 368 of hull 364. Those embodiments of the present disclosure which include the ability to detect acceleration along the longitudinal and lateral axes of hull 364 in FIG. 8H will thus detect acceleration events predominantly on the longitudinal axis of hull 364 with little to no component on the lateral axis of hull 364. When acceleration appears solely on the longitudinal axis of hull 364, it is evident that direction of motion 370 and longitudinal axis 368 of hull 364 are parallel and the yaw angle of hull 364 is zero.

For the second example case, presume that hull 364 of FIG. 8H were somehow accelerated sideways in the surrounding water, i.e. at 90 degrees from its "normal" generally forward direction as represented by direction of hull motion 370. In this case, those embodiments of the present disclosure which include the ability to detect acceleration along the longitudinal and lateral axes of hull 364 in FIG. 8H would detect acceleration events predominantly on the lateral axis of hull 364 with little to no component on the longitudinal axis of hull 364. When acceleration appears solely on the lateral axis of hull 364, it is evident that direction of motion 370 and longitudinal axis 368 of hull 364 are at right angles to each other and the yaw angle of hull 364 is 90 degrees.

This latter case of sideways motion may not occur under normal circumstances, but it is helpful as a technique for describing how acceleration events appear in varying proportions on the different axes of the hull.

The amount of acceleration appearing on each of the longitudinal and lateral axes of the hull is proportional to the yaw angle of the hull at the time the acceleration event occurs. The proportion appearing on a given axis is 100% when the acceleration event is in line with that axis, and 0% when the acceleration event is at right angles to that axis. The proportions appearing on each axis for intermediate yaw angles can be related by standard trigonometric functions familiar to those with ordinary skill in the art.

FIG. 8G can now illustrate this innovation of the present disclosure. Hull 362 has a nonzero yaw angle. As described above, a nonzero yaw angle may result from multiple directional forces on the hull 362, such as drag from trim plate 28 and operator steering of the rudder. As these forces act upon hull 362, hull 362 is rotated about its yaw axis but hull 362 still proceeds "forward" through the surrounding water along direction of hull motion 370. As a result, acceleration events—changes in hull speed—also occur along the direction of hull motion 370. And since direction of hull motion 370 is divergent from longitudinal axis 368 of hull 362, the forces associated with those acceleration events will no longer be concentrated on a single axis as in the straight-line example above. Instead, the forces associated with acceleration events on a hull with nonzero yaw angle will be divided between the longitudinal and lateral axes of that hull.

Continuing with FIG. 8G, those embodiments of the present disclosure with the ability to measure acceleration along the longitudinal and lateral axes will sense a portion of each acceleration event on each of the two axes. Based on the five degree yaw angle in FIG. 8G, a larger portion of the acceleration event will occur on (and be measured by some embodiments of the present disclosure along) the longitudinal axis of hull 362. A smaller portion of the acceleration event can occur on (and be measured by some embodiments of the present disclosure along) the lateral axis of hull 362. These two measurements, using suitable embodiments of the disclosure, can then be related using example trigonometric functions provided herein, to derive the yaw angle.

According to an example and with reference to FIG. 8H, hull 364 is traveling "straight" with zero degrees of yaw angle, i.e. the longitudinal axis 368 and direction of motion 370 are parallel. The total acceleration experienced by hull 364 of FIG. 8H can be normalized to 1.0 and the acceleration along each axis can appear as follows:

Acceleration along longitudinal axis=1.0
Acceleration along lateral axis=0.0
Normalization proof: $\text{sqrt}((1.0^2)+(0.0^2))=1$ In this "straight line" case, acceleration is along the longitudinal axis. The lateral (side to side) axis experiences no acceleration.

Given the above values, a trigonometric function such as the arccosine can be used to derive the angle of acceleration relative to each axis:

Accel. relative to long. axis=arccos(1.0)=0.0 deg
Accel. relative to lat. axis=arccos(0.0)=90.0 deg Referring again to FIG. 8H, the divergence of direction of motion 370 relative to the longitudinal axis of hull 364 is zero degrees; they are parallel, because the hull is traveling "straight". There is no divergence of the longitudinal hull axis from the direction of motion, so the yaw angle is zero degrees. Accordingly, the angle of direction of motion 370 relative to the lateral axis of hull 364 is 90 degrees. In other words, the lateral (side to side) axis is at "right angles" to the direction of motion, because the hull is traveling "straight".

Referring to the configuration of FIG. 8G, if the total acceleration experienced by hull 362 of FIG. 8G is normalized to 1.0, the acceleration along each axis can appear as follows:

Acceleration along longitudinal axis=0.9962
Acceleration along lateral axis=0.0872
Normalization proof: $\text{sqrt}((0.9962^2)+(0.0872^2))=1$ As noted above, the forces associated with acceleration events on a hull with nonzero yaw angle will be divided between the longitudinal and lateral axes of that hull. By again applying the arccosine function to the normalized acceleration measurements, the angle of acceleration relative to each axis may be derived:

Accel. relative to long. axis=arccos(0.9962)=5.0 deg
Accel. relative to lat. axis=arccos(0.0872)=85.0 deg The hull is rotated relative to the direction of travel, and the accelerations reveal the magnitude of that rotation: Five degrees.

Finally, consider FIG. 8J and its five degrees of yaw rotation to the starboard (right) side, opposite that of FIG. 8G as just analyzed. If the total acceleration experienced by hull 366 of FIG. 8J is again normalized to 1.0, acceleration along each axis can appear as follows:

Acceleration along longitudinal axis=0.9962
Acceleration along lateral axis=−0.0872
Normalization proof: $\text{sqrt}((0.9962^2)+(-0.0872^2))=1$ The acceleration measured along the longitudinal axis is the same polarity and magnitude as with FIG. 8G above. However, while the magnitude of the lateral acceleration in FIG. 8J is the same as with FIG. 8G, its polarity has inverted due to the rotation toward the side opposite that of FIG. 8G. This sign change can be used by the present disclosure to determine the direction of hull rotation about the yaw axis. It is important to note that this relationship of positive and negative readings along each axis relative to the direction of hull rotation may differ in various embodiments depending upon the specifics of accelerometer mounting and measurement manipulation.

Once again processing the data, for example with the arccosine function, the present disclosure derives the angle of acceleration relative to each axis:

Accel. relative to long. axis=arccos(0.9962)=5.0 deg
Accel. relative to lat. axis=arccos(−0.0872)=95.0 deg The longitudinal acceleration reading confirms a divergence—a yaw angle—of five degrees. The lateral acceleration reading indicates the direction of rotation by the polarity of its normalized value and/or the modulo-90 offset of its arccosine. In this latest example, the negative polarity of the lateral acceleration (and its >90 degree arccosine value) indicate rotation of the hull toward its starboard (right) side. And by comparing the longitudinal angle with the lateral angle, the present disclosure can confirm that all sensors are operating properly and returning valid, coordinated values.

Upon deriving the yaw angle as described above, some embodiments of the present disclosure use the yaw angle value to control the hull of the wakeboat. Referring to FIG. 9, system 154 can selectively control trim plates via connection Trim plate(s) power and sensing 414 to alter the yaw angle of the hull. The trim plates thus controlled may be oriented vertically, horizontally, or any other orientation suitable to the specific embodiment. Additionally, system 154 can selectively control pumps via connection Pump(s) power and sensing 416 to adjust the amount of ballast in one or more ballast compartments aboard the wakeboat, to alter the yaw angle of the hull. Other hull control mechanisms may also be selectively employed by system 154 via connection Power and Sensing for other Configurable Control Mechanisms 412 to alter the yaw angle. System 154 can repeatedly measure the yaw angle and apply ongoing adjustments to the hull to compensate for changing conditions.

In some embodiments, system 154 may control the hull to minimize its yaw angle. System 154 may also control the hull to establish and maintain a previously stored, or newly determined, yaw angle. Any of these yaw angle control techniques may be employed individually, in combination, or together with other hull control techniques such as those associated with the control of hull rotation about its longitudinal and/or lateral axes.

The flowchart of FIG. 20 illustrates at least one example processing algorithm that may be used to determine acceleration values from data acquired according to some embodiments of the present disclosure. Other techniques for deriving rotation about a third axis from the acceleration along two other axes are possible and neither FIG. 20 nor the examples above are to be construed as limiting.

Advantages of this latter technique of measuring the yaw angle are significant. This latter technique can determine the yaw angle without any "fin" style sensors. Likewise, no pressure transducers are required. The hull penetrations associated with such external sensors, and the attendant ongoing maintenance and risks of physical damage and water intrusion, are eliminated. This latter technique is even advantageous over the present disclosure's innovation, described earlier, of measuring the forces impinging upon various control surfaces, because this latter technique eliminates the need for additional sensors mounted to those control surfaces. This latter technique achieves the ultimate in efficiency, reliability, and cost effectiveness by delivering an entirely new capability using only the sensors which are already included in of some embodiments of the present disclosure.

Some embodiments of the present disclosure are able to manage, control, and restore the yaw angle. This may be important when the yaw angle plays a role in the quality of the wake behind the wakeboat, or when the devices affecting the wake are themselves sensitive to the yaw angle. Referring to FIG. 9, system 154 may be equipped with connections with various hull control devices that may selectively affect the orientation of the hull, such as connections to pump(s) power and sensing 416, trim plate(s) power and sensing 414, and power and sensing for other configurable control mechanisms 412. System 154 may employ one or more of the hull control devices thus connected to establish, change, restore, and/or correct the yaw angle of the hull. Suitable embodiments of the present disclosure may record and/or retrieve yaw information in memory 418, display yaw information on various human interface devices 406, communicate yaw information via portable device interfaces 408, and/or transmit and/or receive yaw information via RF (wireless) interfaces 410 when these accessories are available.

One or more filtering techniques may be usefully employed by some embodiments of the present disclosure to remove unimportant, unrelated, or unnecessary data from the acceleration information associated with yaw angle measurement. For example, jostling of the wakeboat hull by random undulations in the surrounding water surface can appear as random acceleration events and introduce "noise" into measurements. Some embodiments of the present disclosure may incorporate one or more filtering techniques modifying the acceleration measurements to remove extraneous content. A broad spectrum of filtering techniques for a wide range of possible conditions may be supported by some embodiments of the present disclosure and be realized programmatically, electrically, mechanically, or by any approach as suited to the specifics of the embodiment in question.

Another enhancement employed by some embodiments of the present disclosure is the correlation of hull speed to acceleration events on the axes in question. As illustrated in FIG. 9, system 154 includes connections to power and sensing for other configurable control mechanisms such as boat speed and engine throttle/RPM 412. In some environments it may be advantageous for system 154 to correlate acceleration events with the boat speed as provided by connections 412 to enhance the removal of extraneous data from acceleration measurements. Boat speed as provided by connections 412 may be measured by a "paddlewheel" speed sensor, a pressure-driven speed sensor, an ultrasonic speed sensor, a GPS speed sensor, or any other type of sensor suited to the specifics of the embodiment in question.

Yet another enhancement provided by some embodiments of the present disclosure is the correlation of steering, or rudder movement, with yaw angle sensing and correction. For example, in some embodiments it may be advantageous to temporarily disable correction of the yaw angle of the hull when the operator of the wakeboat intentionally steers the hull away from a straight line of motion. In some embodiments it may also be useful to sense the steering action of the rudder and adjust the yaw angle and/or other characteristics of the hull to preserve, to the extent possible, the nature of the wake behind the hull while the hull is executing a turn so that watersports participants are minimally affected by the need to turn the wakeboat.

Some embodiments of the present disclosure include interfaces to external devices. For example, FIG. 9 illustrates computer interfaces 408 which may include physical connectors or other apparatus to permit Personal Digital Assistants (PDA's), USB memory sticks ("thumbdrives"), smartphones, portable music players, handhelds, tablets, laptops, notebooks, netbooks, and other portable computing devices, and similar electronic products to communicate with system 154 or memory 418. Radio Frequency (RF, or wireless) computer interfaces 410 may also be included to permit compatible devices to communicate with system 154 or memory 418 without requiring a wired connection.

One embodiment of the present disclosure can use a portable computer such as a smartphone, tablet computer, laptop computer, or similar device to realize some of its processing circuitry. Such a computing device could be, for example, an Apple iPad (Apple Incorporated, 1 Infinite Loop, Cupertino, Calif. 95014, United States) or another device whose characteristics suit the specific application. Referring to FIG. 9, the iPad includes many of the components used by the present disclosure including system 154, memory 418, user interfaces 406, computer interfaces 408 and 410, and sensors 400 and 404. Those components of the present embodiment not included in the iPad or similar computing device such as sensor 402, and power and sensing 412, 414, and 416, could be connected to the computing device using computer interfaces 408 and/or 410 to realize the embodiment of the present disclosure depicted in FIG. 9.

The social nature of watersports often sees participants going out on different watercraft on the same or different days. A great deal of time can be spent fine tuning and then storing the wake preferences of a given participant in that watercraft's ballast system, but all of that effort must be repeated when that participant goes out on a different watercraft—even if the watercrafts are identical makes and models. This problem compounds with the number of participants and the number of watercraft between them, wasting a considerable amount of valuable time and expensive fuel as the same actions are repeated over and over by every participant on every watercraft.

One embodiment of the present disclosure corrects this problem via portable device interfaces 408 and RF (or wireless) computer interfaces 410. Watersports participants could, for example, copy selected contents of memory 418 to an external device. When they return to the same or another wakeboat with their external device, their preferred configurations could be copied to memory 418 on that wakeboat and made available for use. Thus wakeboats equipped with the present disclosure need not store permanent copies of their configurations, and changes to a participant's preferences could automatically "follow" them from boat to boat.

RF (or wireless) interfaces 410 could also be used for direct wakeboat-to-wakeboat data transfer. For example, if the operator of one wakeboat stores a particularly advantageous configuration, it could be shared with other wakeboats in the immediate vicinity via an RF connection through interface 410. In this manner, human error associated with the manual duplication of data could be substantially reduced. Participant preferences could also be copied via RF connection in like fashion when passengers move from one wakeboat to another, eliminating the requirement to carry external devices from boat to boat.

Connection to external devices via computer interfaces 408 or 410 could also be used to update the software or other operating parameters of system 154 or other components and devices within the overall system.

Another inadequacy of the existing art is inaccurate reporting of onboard resources such as fuel. For example, it is almost a standing joke amongst watercraft owners that their fuel gauges bear only the most remote relationship to the amount of fuel actually in the fuel tank. This condition has only worsened as analog gauges have been replaced by touchscreens and other computerized displays with their suggestion of single-digit accuracy. More than a source of humor, however, this situation can be dangerous if the watercraft operator relies upon such invalid data and is thus misinformed as to the actual amount of fuel onboard. This inaccuracy is often exacerbated by irregularly shaped tanks, offcenter tank sensors, and nonlinear response from tank sensors.

The result is that the tank fill level reported to the wakeboat operator may not correspond to the actual fill level in the tank itself. For example, when the tank fill level is shown as 50%, it may actually be significantly more or less than the indicated value. Worse, the magnitude and direction of the error may change throughout the indicated range—making it nearly impossible for the watercraft operator to mentally correct from the indicated reading.

Figure 10:
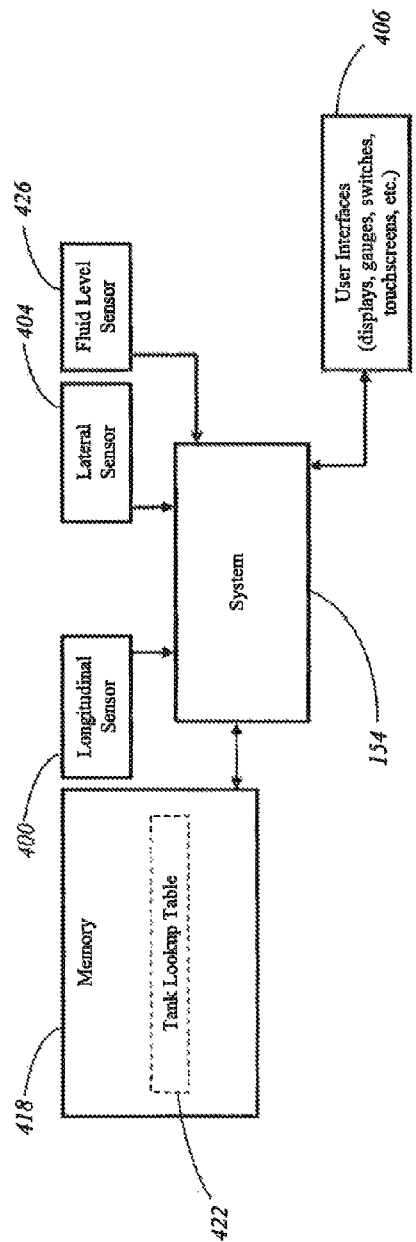
FIG. 10 is a block diagram of a watercraft tank monitoring system with a tank lookup table and connections to associated components.

FIG. 10 illustrates one embodiment of the present disclosure that addresses this critical problem. Some components including system 154, memory 418, user interfaces 406, and sensors 400 and 404 have already been described. As noted earlier, sensors 400 and 404 could be inclinometers, draft sensors, or another type of sensor suited to the specifics of the application. New to FIG. 10 is tank lookup table 422 in the database within memory 418, and fluid level sensor 426 which is operatively coupled to the tank in question.

Continuing with the embodiment of FIG. 10, fluid level sensor 426 provides an indication of the current fill level of the tank in question to system 154. In the existing art, this indication would simply be indicated via user interfaces 406. However, in the present disclosure system 154 uses the information from fluid level sensor 426 as an index into a tank lookup table 422 in memory 418. Tank lookup table 422 thus translates sensor values into corrected values, and system 154 can then display the corrected values via user interfaces 406.

Figures 11A, 11B:
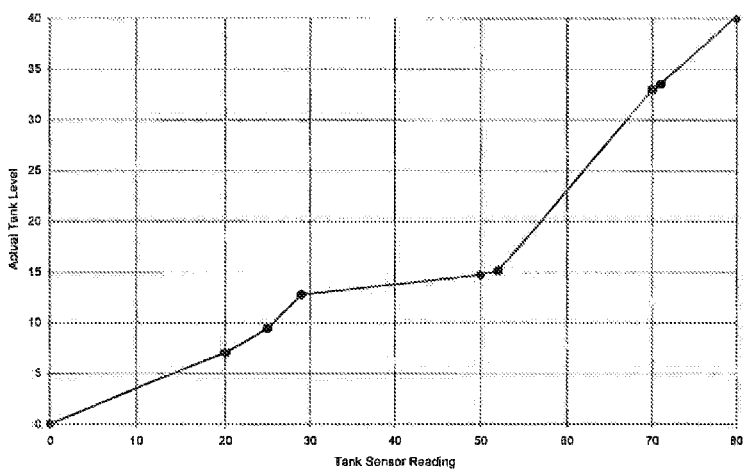
FIGS. 11A and 11B illustrate a partially populated tank lookup table, and a graph of the table's values.

FIG. 11A shows a partially populated tank lookup table 422 in one embodiment of the present disclosure. For this example embodiment, the present disclosure permits the watercraft operator to "train" system 154 by populating the tank lookup table when fluid is added. The sample tank lookup table of FIG. 11A is based on a hypothetical 40 gallon tank, and comprises an "initial sensor" column 450, an "amount added" column 452, a "final sensor" column 454, and a "calculated initial level" column 456.

The values of entry 458 in FIG. 11A are an example of adding fluid to the tank from an initially empty condition. The watercraft operator uses user interfaces 406 of FIG. 10 to notify system 154 of FIG. 10 that fluid will be added to the tank. System 154 records the present sensor value for this table entry in column 450, which for entry 458 in this example is zero. The watercraft operator then adds some amount of fluid to the tank, and when finished uses user interfaces 406 to notify system 154 of the amount added which for entry 458 is 40 gallons. System 154 records this value as the "amount added" in column 452. System 154 then records the new sensor value for this table entry in column 454, which in this example is now 100 percent. Finally, system 154 calculates the initial fill level—the level of fluid in the tank when the operator first notified system 154 that a fill operation was commencing, in this case zero percent—and records that in column 456.

For this example embodiment, the process described in the preceding paragraph can be repeated each time fluid is added to the tank. The result is an array of entries in the tank lookup table as shown in FIG. 11A. A key aspect of this embodiment of the present disclosure is that not all initial sensor values are zero, and not all final sensor values are 100. For example, entry 462 in FIG. 11A shows an initial sensor value of 20 percent and a final sensor value of 70 percent. The present disclosure actually takes advantage of variability in initial and final sensor values to develop a more comprehensive understanding of the relationship between sensor readings and actual tank fill levels.

FIG. 11B illustrates this relationship for this example embodiment, using the sample tank lookup table of FIG.

11A. As shown in FIG. 11B, the relationship between tank sensor readings (on the horizontal axis) and actual tank levels (on the vertical axis) is often nonlinear and thus misleading to a watercraft operator. However, system 154 can use the tank lookup table to provide more accurate indications of tank fill levels. For those tank sensor readings that do not have an exact match in the tank lookup table, system 154 can derive a reasonable estimate using interpolation of the data in the tank lookup table. And the more populated the table becomes, the more accurately system 154 can interpolate intermediate values.

In other embodiments of the present disclosure, the tank lookup table 422 of FIG. 10 could contain different types of information more suited to the specifics of the application. Tank lookup table 422 could also be pre-populated at the factory with a set of initial values, which could then be augmented or perhaps even replaced as system 154 or the watercraft operator gains experience with the particular watercraft and its components.

One example of another type of information that could be present in other embodiments of the present disclosure includes longitudinal and lateral angle information as received from longitudinal sensor 400 of FIG. 10 and lateral sensor 404 of FIG. 10. The unusual and sustained hull angles caused by ballasting systems, as described earlier, often compound the problem of inaccurate tank level indications by shifting tank contents toward or away from sensors. A watercraft which is level might indicate one tank fill level, but when tilted on one or both axes show an entirely different tank fill level.

Figure 12B:
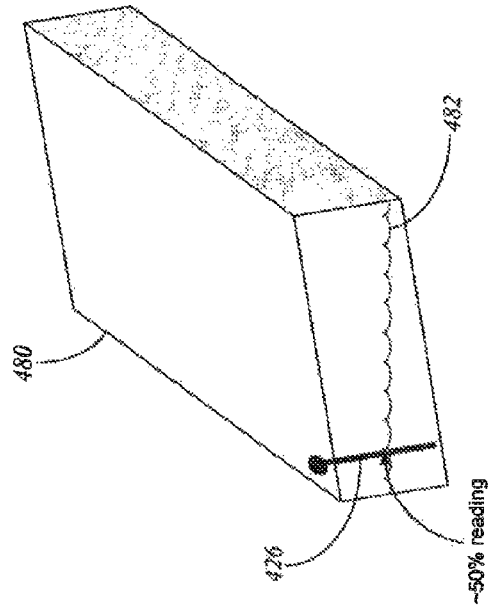
FIGS. 12A and 12B illustrate two views of a tank on a watercraft, with the watercraft at different angles of rotation around its longitudinal axis.
Figure 12A:
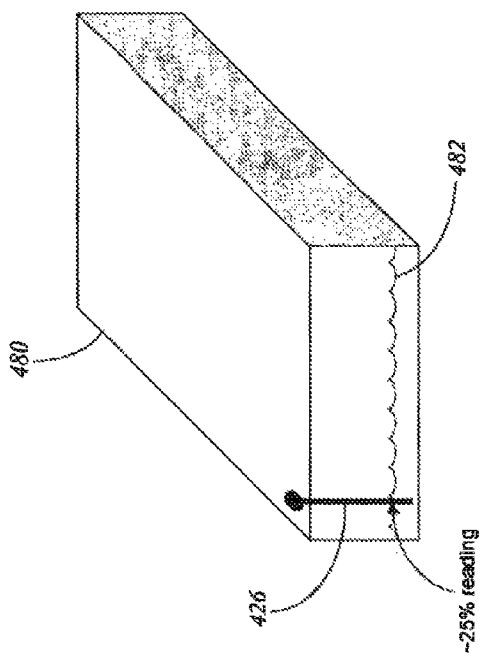

The specifics of such a correction would be very implementation specific, but one example will illustrate the effect. FIG. 12A illustrates a tank 480 in a watercraft with fluid level sensor 426 located in the left rear corner of the tank. In this example, fluid level 482 is approximately 25% of maximum. The watercraft and tank 480 are at normal longitudinal and lateral angles as illustrated in FIGS. 8B and 8D. Under these ideal conditions fluid level sensor 426 of FIG. 12A would read approximately 25%.

If the watercraft then experiences rotation on its longitudinal axis that lowers the left side of the hull, such as shown in FIG. 8A, the fuel tank and its tank sensor will rotate with the hull but the fuel therein will remain level. An example of the result is illustrated in FIG. 12B, wherein tank 480 is tilted in accordance with a rotation around the longitudinal axis that lowers the left side of the watercraft. Fluid level sensor 426 moves with tank 480. However, the fluid within the tank remains level and fluid level 482 is not affected by the longitudinal angle. Because fluid level sensor 426 has moved relative to fluid level 482, fluid level sensor 426 will now yield an erroneous reading of approximately 50% despite the fact that the actual amount of fluid in the tank is unchanged.

Rotation around the lateral axis of the watercraft can have similar effects. For example, FIG. 8F shows a watercraft with lateral tilt that lowers the stern (rear) of the hull. If tank 480 of FIG. 12A were mounted in the watercraft of FIG. 8F, tank 480 of FIG. 12A would also experience rotation around its lateral axis such that the rear of the tank—the end nearest fluid level sensor 426—would be lowered relative to the fluid therein. Once again, the normal 25% reading would be erroneously increased due to fluid level sensor 426 effectively being lowered deeper into the unchanged fluid level.

To address this problem, embodiments of the present disclosure which include one or both of sensors 400 and 404 of FIG. 10 could advantageously apply longitudinal and lateral corrections when using tank lookup table 422. Any changes reported by fluid level sensor 426 that occur while sensors 400 and 404 are also changing could be used to offset the effect of hull angles on the information from fluid level sensor 426.

As noted earlier with respect to ballasting, a multitude of factors may cause transient changes to tank levels. Fluids in tanks are known to "slosh" to some degree, even when the tanks in question have internal baffles to reduce such motion. The information provided by fluid level sensor 426 may require filtering to eliminate extraneous content. A broad spectrum of filtering techniques for a wide range of possible conditions may be supported by the present disclosure and be realized programmatically, electrically, mechanically, or by any approach as suited to the specifics of the embodiment in question.

Yet another limitation of the existing art is that ballast configurations are unique to that watercraft manufacturer and model. Even if participants remember the "settings" that produce their preferred wake in one watercraft, those values are unlikely to apply to other watercraft. Existing embodiments provide no method to relate one watercraft model's set of preferred parameters to another watercraft model, again wasting a considerable amount of time and fuel for each and every watercraft model for each and every participant.

Figure 13:
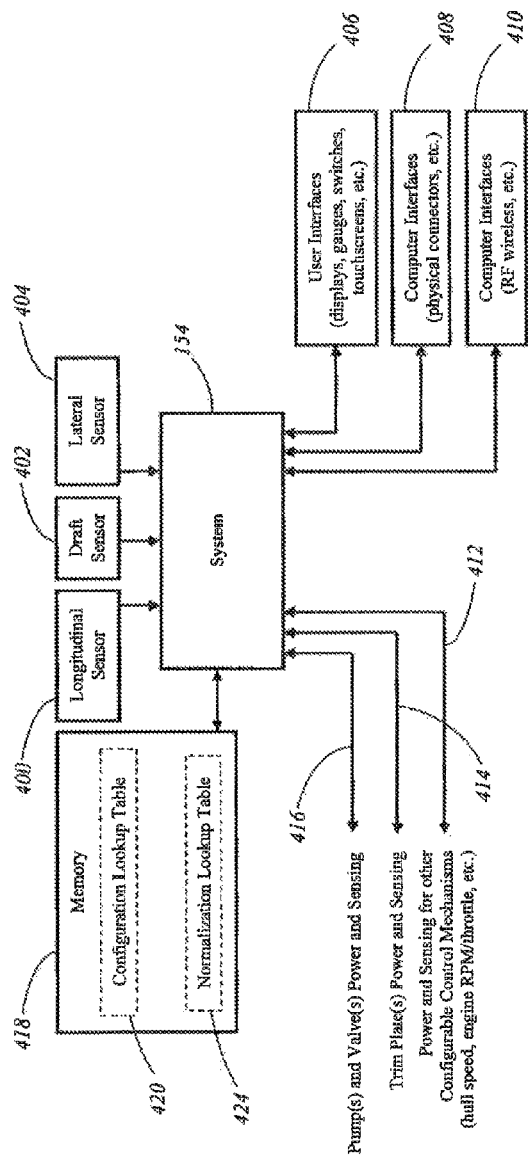
FIG. 13 is a block diagram of a wakeboat ballast control system with a normalization lookup table, a configuration lookup table, and connections to associated components.

One embodiment of the present disclosure addresses this shortcoming of the existing art by normalizing a wakeboat's characteristics to a common set of parameters. Similar to industry standards that otherwise competitive manufacturers adopt for their mutual benefit, this normalized parameter set enables the ballast and wake behavior of a given watercraft to be described in terms that can be related to other watercraft equipped with the same capability. FIG. 13 illustrates one embodiment of the present disclosure that incorporates this improvement. Based on FIG. 9, FIG. 13 adds a database comprising a normalization lookup table 424 to memory 418 which already comprises configuration lookup table 420. Sensors 400, 402, and 404 are also still present, as are system 154 and its processing circuitry, together with other components (and the associated capabilities that derive from them) in previously described embodiments of the present disclosure.

In one embodiment, configuration lookup table 420 of FIG. 13 stores values specific to the watercraft in which it is installed. Normalization lookup table 424 can then be used to correlate the orientation of the hull of the first watercraft to a standardized set of parameters. Those normalized, generic parameters can then be transferred to other watercraft via portable device interfaces 408 or RF (wireless) interfaces 410. Upon their arrival at a second watercraft, that second watercraft's normalization table 424 can be used to correlate the normalized parameters into values applicable to the second watercraft, which can then be stored in the second watercraft's configuration lookup table 420. These values then become available to the processing circuitry for control of the ballast system as already described.

One possible embodiment for the normalization lookup table 424 of FIG. 13 is illustrated in FIG. 14. In this partially populated normalization lookup table, several modes of wake generation can be represented including "Dual Wake" starting at the top row 500, "Port Wake" in section 518, and "Stbd Wake" in section 520. Within the section for each wake generation mode, the effect of this watercraft's various configurable parameters is described with respect to wake characteristics in column 502 such as "height", "length", and more. For each such wake characteristic, watercraft parameters in column 504 list watercraft configurable parameters.

Finally, for each such configurable parameter, column 506 indicates the effect at minimum setting; column 508 indicates the effect at the midrange setting; and column 510 indicates the effect at maximum setting. The resulting table provides an indication of the wake that will be generated by this watercraft, and how that wake will be affected as various configurable parameters are varied throughout their range.

To further assist with understanding this aspect of the present disclosure, FIG. 14 details possible embodiments for two sample subsections of the "Dual Wake" section starting in row 500. Row 511 begins the "height" subsection wherein are described the effects of several watercraft configurable parameters on the height of the resulting dual wake. Continuing across row 511, the first watercraft parameter is "center trim plate". In the current example, this refers to the relative setting of the center trim plate 26 of FIG. 1. Continuing across row 511, column 506 indicates that when the center trim plate is at its minimum setting, the effect on the height of the wake in Dual Wake mode is "100", or 100% of the normalized value (that is, the standardized wake "height" when in dual wake mode). Continuing further across row 511, column 508 indicates that when the center trim plate 26 of FIG. 1 is at its midrange setting, the effect on the height of the wake in Dual Wake mode is still "100". Finally, column 510 indicates that when the center trim plate 26 of FIG. 1 is at its maximum setting, the height of the wake in Dual Wake mode is reduced to 25% of the standardized wake height when in Dual Wake mode.

Careful inspection of row 511 as just analyzed reveals that the effect of center trim plate 26 of FIG. 1 is decidedly nonlinear through its operating range. Minimum and midrange settings permit a dual wake of full height to be generated, but a maximum setting can curtail the size of a dual wake.

Continuing with analysis of parameters affecting wake height in Dual Wake mode as illustrated by FIG. 14, the next parameter in column 504 is "port stern ballast" in row 512 which would correspond to the amount of ballast in ballast compartment 4 of FIG. 1. As indicated in column 506 of row 512, the effect of a minimum amount of such ballast is zero percent of the normalized wake height. Column 508 shows that a midrange amount of ballast yields 50% of the normalized wake height. Column 510 shows that the maximum amount of ballast in the port stern ballast compartment contributes to achieving 100% of the normalized wake height in Dual Wake mode.

In contrast with the center trim plate of row 511, the effect of the port stern ballast of row 512 is reasonably linear with respect to the resulting wake height in Dual Wake mode. The same can be seen of the next parameter in column 504, "stbd stern ballast", which would correspond to the amount of ballast in ballast compartment 22 of FIG. 1.

The interpretation and use of the possible embodiment in FIG. 14 should now be clear. However, to leave no room for misinterpretation, analysis of FIG. 14 will continue with row 513 which documents the effect of "port bow ballast" on wake height when in Dual Wake mode. "Port bow ballast" would correspond to the amount of ballast in ballast compartment 12 in FIG. 1. As shown in column 506 of row 513 in FIG. 14, a minimum amount of such ballast permits 100% of the normalized wake height to be achieved. Column 508 indicates that a midrange amount of such ballast will reduce the wake height to 80% of its normalized value. Finally, column 510 shows that a maximum amount of ballast in that location will drop the wake height to just 70% of its normalized value. Thus it is evident that a greater amount of ballast in compartment 12 of FIG. 1 leads to a reduced wake height when in Dual Wake mode, reducing displacement and thus reducing the height of the wake.

One more entry in the sample normalization lookup table of FIG. 14 will be examined. Row 515 indicates the effect of "port stern ballast" on the length of the wake when in Dual Wake mode. Column 510, which indicates the effect of this parameter when it is maximized, shows that a maximum amount of such ballast yields a wake length that is 125% of the normalized wake length for Dual Wake mode. As the state of wakeboat design and manufacturing progresses, it is to be expected that performance may exceed the original normalized values used for inter-watercraft data exchange. Provision is thus made for watercraft that can, when properly configured, exceed the standardized values used for the exchange of configuration data.

The sample normalization lookup table of FIG. 14 also illustrates other wake characteristics that may prove advantageous during data transfer between watercraft. For example, rows 516 show that "wake steepness", "wake lip sharpness", and "wake trough depth" may be characterized and the effects of the parameters in column 504 reflected by suitable entries in columns 506, 508, and 510. Likewise, other wake generation modes such as "Port Wake" rows 518 and "Stbd Wake" rows 520 may be included. In some embodiments, only those wake generation modes that apply to the type of watercraft may be included. The specific wake generation modes, the specific wake characteristics, the specific parameters, and other values stored in the normalization lookup table may vary in different embodiments as dictated by industry standards, the configurable features on the given watercraft, and other factors.

Another embodiment of this aspect of the present disclosure may use interpolation to derive intermediate settings that are not directly represented in the normalization lookup table. Just as the tank lookup table of FIG. 11A can be used to interpolate intermediate values as described earlier, so too can system 154 of FIG. 13 interpolate intermediate values using data from normalization lookup table 424. Some embodiments of normalization lookup table 424 may include more than just values for minimum, midrange, and maximum parameter settings and in the presence of such additional data system 154 may interpolate more accurate intermediate values.

In practice, when configuration parameters from one watercraft are to be transferred to a second watercraft of the same make and model, no alteration is likely to be required. The values from configuration lookup table 420 of FIG. 13 may be copied into the configuration lookup table 420 in the second watercraft. However, when the second watercraft is of dissimilar manufacturer or model and it is likely that the characteristics of the watercraft are significantly different; the first watercraft's configuration parameters can be normalized by using normalization lookup table 424 of FIG. 13 before transferring the data to the second watercraft.

As an example of this procedure, presume a wakeboat with a configuration lookup table entry that produces dual wakes that are 50% of the normalized height value. If it is desired to transfer this configuration to another wakeboat of sufficiently different characteristics, the configuration values can be normalized. Using the normalization lookup table of FIG. 14, the procedure can begin with the "center trim plate" parameter of row 511. The desired 50% effect lies between the midrange setting effect of column 508 and the maximum setting effect of column 510. Interpolating, an effect of 50% would yield a normalized value of 83 for "center trim plate".

Taking the next parameter—"port stern ballast"—the desired 50% effect happens to be the effect of the midrange setting for this parameter on this wakeboat. Therefore, "port stern ballast" would use a normalized value of 50.

Likewise, "stbd stern ballast" would translate a 50% effect to a normalized value of 50 for this wakeboat.

This procedure would thus continue through all appropriate parameters until the configuration values had been normalized. This normalized set of values could then be transferred to the target watercraft, where they would express the desired configuration using a generic set of values understandable by any watercraft equipped with the present disclosure. The normalization process could then be reversed—but this time using the destination watercraft's own normalization lookup table to convert the generic values to those appropriate for the destination watercraft.

In this manner, the present disclosure can provide configuration data specific to one watercraft to be used by another, perhaps dissimilar watercraft. By providing each watercraft with its own normalization lookup table that relates the specifics of that vessel to an intermediate, standardized set of values, it becomes possible for dissimilar watercraft to communicate and share information.

It is important to note that the normalization lookup table 424 in a destination watercraft may contain quite different values from that in the originating watercraft, precisely because the two watercrafts are dissimilar. Therefore, applying normalization lookup table 424 to the incoming normalized data will likely yield substantially different values to be stored in the destination watercraft's configuration lookup table 420. Simply stated, to achieve similar results from dissimilar watercraft requires each watercraft to be configured differently. While the initial results may not always yield identical wake and ballast behavior—it may not always be possible to exactly duplicate the behavior of one watercraft with another—this aspect of the present disclosure can get closer, faster, than the alternative offered by existing art.

The foregoing describes just one possible embodiment of this feature of the present disclosure. Other embodiments, which may for example involve quite different data storage and translation methodologies, are equally appropriate as long as they accomplish the function of permitting the translation of configuration data between watercraft.

During a transfer of configuration data, one embodiment of the present disclosure can transmit or exchange manufacturer, model, and other useful characteristics between the watercrafts involved. System 154 of FIG. 13 on one or both of the watercraft can then examine this information and make decisions regarding the normalization process. For example, if the manufacturers and models are identical, normalization may not be required and the normalization step on both watercraft could be omitted. In another case, where the manufacturers are identical but the models are dissimilar, system 154 may have sufficient information regarding model similarities to decide which of normalized values or unmodified data from configuration lookup table 420 would be more advantageous. Many such enhancements may be realized by an increase in the types and amount of identifying information shared between watercraft.

Another limitation of the existing art is that specialized hull shapes often encourage the accumulation of water in the lowest areas of the hull, often referred to as the "bilge". While virtually all watercraft are equipped with bilge pumps to drain undesired water, the specialized hull shapes used with watersport boats often cause such water to accumulate in thin layers covering a large surface area. This results in a large amount of water whose level is not deep enough for traditional bilge pumps to evacuate it.

For example, in contrast to the V shaped hulls of many boats, the interior hull surfaces of some sport watercraft have large flat regions where water can pool. These flat areas can be many square feet in surface area, which means that even a thin layer of water can amount to many gallons of water.

Other examples include more traditional V shaped hulls, but where the keel of the hull runs almost horizontal along the longitudinal axis for distances of many feet. Again, a shallow depth of water extending a lengthy distance can add up to a surprisingly large volume of water, yet it's very shallowness prevents traditional bilge pumps from evacuating it.

Traditional bilge pumps fail to handle shallow water depths primarily because of their intake design. To pump water, their intakes must be completely submerged so as to maintain "suction" and draw water instead of air. If any portion of the intake is above water, suction is lost and little to no water is pumped.

Another limitation of traditional bilge pumps is that they are typically controlled by a water detecting switch, the most common variety being a "float switch". As the name implies, a buoyant component or "float" is coupled to an electrical switch such that when the water level rises above a certain point, the switch is closed and power is applied to the bilge pump. When the water level drops sufficiently, the float drops as well; the electrical switch is thus opened and bilge pump power is removed.

Float switches, and other types of bilge pump switches, suffer from conflicting design parameters. If they trigger upon too high a water level, too much water can be allowed to accumulate before the bilge pump is activated. If they are set too low, they can be excessively triggered by small amounts of water sloshing back and forth due to natural hull motion. In this latter case, the bilge pump can be excessively cycled, often when the actual water level is below that necessary for the bilge pump to do useful work. Such treatment consumes the useful lifespan of the bilge pump and also wastes energy.

The inadequate design of existing bilge pumps and their switches can thus permit large amounts of water to remain within the hull where it encourages mold, mildew, corrosion, deterioration of equipment, and other moisture related problems. An improvement to bilge pump and switch design would be of significant benefit, particularly to the sport watercraft industry with its specialized hull shapes that seem almost designed to accumulate water that is difficult to effectively evacuate.

Figure 15A:
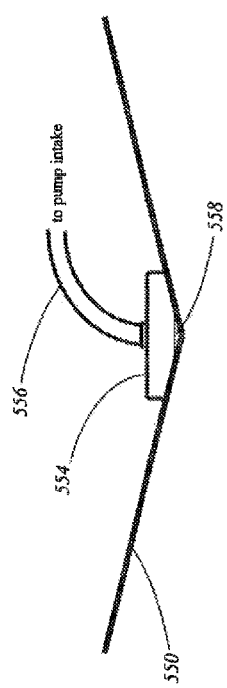
FIGS. 15A-15C illustrate three configurations of watercraft bilge pump adapters.

FIG. 15A illustrates one embodiment of the present disclosure. Adapter 554 is mounted to the inside surface of V shaped hull 550. One end of hose 556 connects to adapter 554; the other end of hose 556 connects to the intake of the (remotely located) bilge pump.

Continuing with FIG. 15A, the bottom of adapter 554 is shaped to fit closely with the inside profile of hull 550. However, the bottom center of adapter 554 is flat and does not match the angle of hull 550. This results in a small channel 558 of generally triangular cross section running under adapter 554. Channel 558 runs entirely across adapter 554 and is open at both ends to the surrounding area.

Figure 15B:
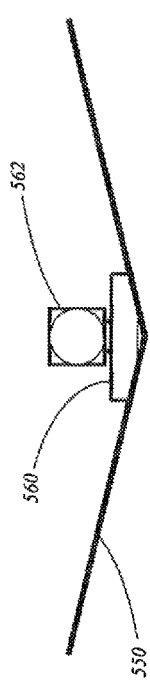

FIG. 15B illustrates another embodiment of the present disclosure. In this embodiment, adapter 560 again mounts to hull 550 with a small channel running underneath. However, in FIG. 15B the bilge pump 562 mounts directly to adapter 560. This arrangement may be advantageous in certain installations over having a remotely mounted bilge pump with connecting hose. Other than the direct versus remote mounting of the bilge pump, however, the embodiments in FIGS. 15A and 15B are functionally equivalent and only one style will be further illustrated.

Figure 16A:
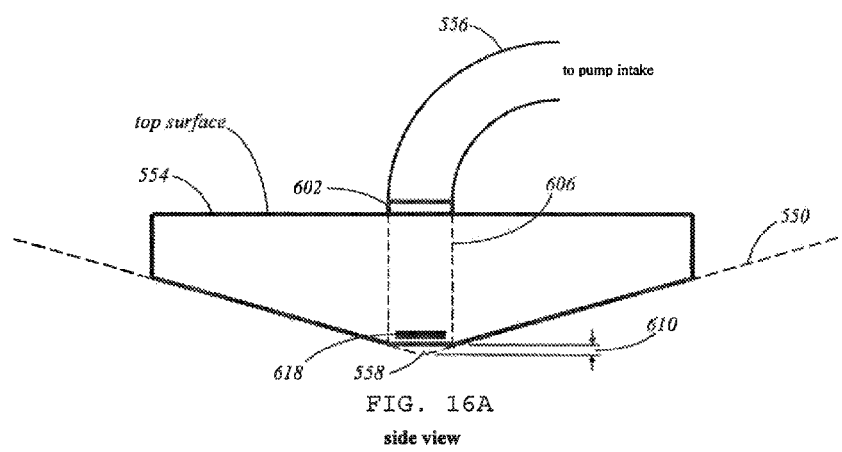
FIGS. 16A-16B are closeup views of one configuration of a watercraft bilge pump adapter for bilges having a V profile.

FIG. 16A provides a closeup side view of the V hull version of the present disclosure. Adapter 554 is profiled to match the angle of hull 550. Hose 556 attaches to adapter 554 at connection 602, which may be a threaded connection or any other type appropriate for the application and hose type in use. Connection 602 is fluidly connected to a passageway 606 which passes vertically through adapter 554 and provides hydraulic communication from connector 602 to the flat bottom surface of adapter 554, and thus to channel 558 formed by adapter 554 and hull 550.

Continuing with FIG. 16A, water which accumulates in the area surrounding adapter 554 will flow through channel 558. Dissimilar water levels on either side of adapter 16A will self-level via channel 558. Channel 558 thus provides a passage for fluid along the bottom surface of the adapter. As noted above, channel 558 is also in hydraulic communication with passageway 606, thus with hose 556, and thus the bilge pump.

Still referring to FIG. 16A distance 610 is the height of channel 558. Due to the uninterrupted hydraulic communication from channel 558 to the bilge pump, channel 558 becomes the intake of the bilge pump and distance 610 becomes the minimum depth to which water can be evacuated without the bilge pump beginning to draw air. Distance 610 can be easily set to any desired water depth as long as channel 558 has adequate cross sectional area to permit sufficient water flow to the bilge pump. In practice, distance 610 can be made quite low, permitting the bilge pump to evacuate the water level much lower than traditional bilge pumps.

Figure 16B:
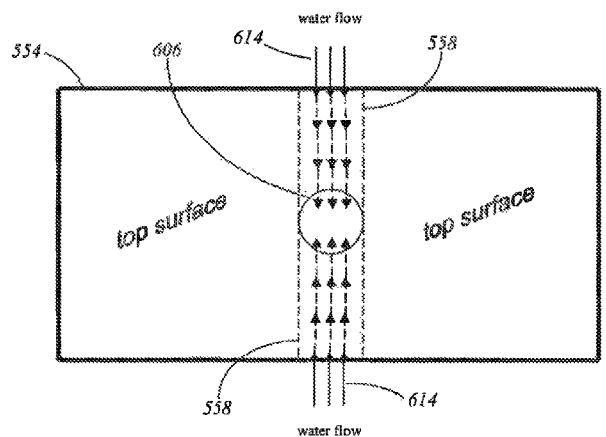

FIG. 16B provides a top view of adapter 554. Channel 558 is shown to pass completely beneath adapter 554, with water 614 flowing in from both directions toward vertical passageway 606.

Adapter 554 may optionally include one or more water sensors. In one embodiment, a water sensor 618 is located symmetrically on either side of adapter 554 immediately above channel 558. In this embodiment, automated bilge pump operation occurs when both water sensors 618 detect water; this ensures that both openings of channel 558 are underwater, thus preventing the bilge pump from futilely attempting to pump water when its intake is exposed to open air.

Figure 15C:
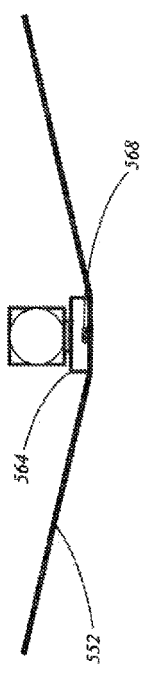

FIG. 15c illustrates another embodiment of the present disclosure, for a flat bottomed hull or a hull with a flat section. Adapter 564 is attached to the flat portion of hull 552. The bottom center of adapter 564 has one or more slots 568 that run entirely across adapter 564 and functionally correspond to the channel 558 in FIGS. 15A and 16A.

Figure 17A:
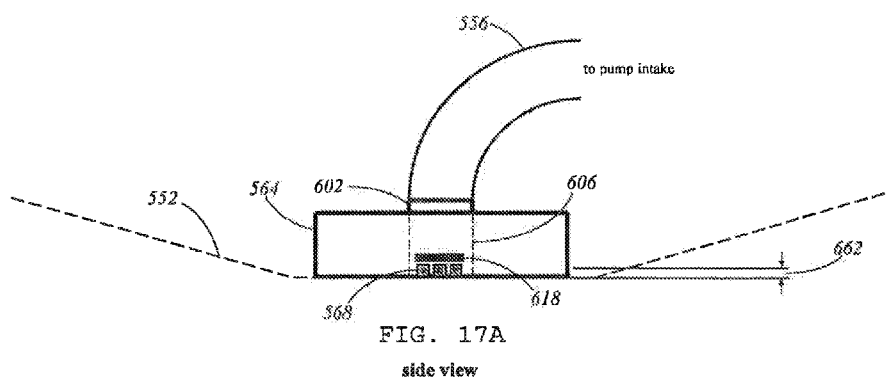
FIGS. 17A-17B are closeup views of one configuration of a watercraft bilge pump adapter for bilges having a flat profile.

FIG. 17A provides a closeup side view of the flat hull version of the present disclosure. Adapter 564 is profiled to match the angle of hull 552. As with the V hull embodiment, hose 556 attaches at connection 602, which may be a threaded connection or any other type appropriate for the application and hose type in use. Connection 602 is fluidly connected to a passageway 606 which passes vertically through adapter 564 and provides hydraulic communication from connector 602 to the flat bottom surface of adapter 564, and thus to slots 568.

Continuing with FIG. 17A, water which accumulates in the area surrounding adapter 564 will flow through slots 568. Dissimilar water levels on either side of adapter 17A will self-level via slots 568. As noted above, slots 568 are in hydraulic communication with passageway 606, and thus hose 556, and thus the bilge pump.

Still referring to FIG. 17A, distance 662 is the height of slots 568. Due to the uninterrupted hydraulic communication from slots 568 to the bilge pump, slots 568 become the intake of the bilge pump and distance 662 becomes the minimum depth to which water can be evacuated without the bilge pump beginning to draw air. Distance 662 can be easily set to any desired water depth by appropriately sizing slots 568 as long as slots 568 have adequate cross sectional area to permit sufficient water flow to the bilge pump. In practice, distance 662 can be made quite low, permitting the bilge pump to evacuate the water level much lower than traditional bilge pumps.

Figure 17B:
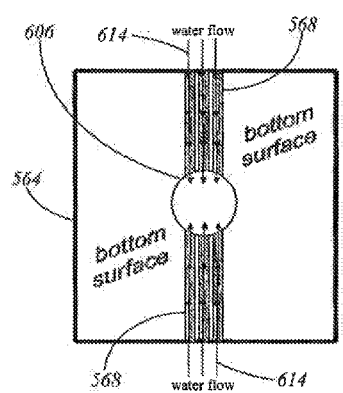

FIG. 17B provides a top view of adapter 564. Slots 568 are shown to pass completely beneath adapter 564, with water 614 flowing in from both directions toward vertical passageway 606.

Adapter 564 may optionally include one or more water sensors. In one embodiment, one water sensor 618 is located symmetrically on either side of adapter 564 immediately above slots 568 for a total of two water sensors. As with the V hull embodiment, automated bilge pump operation occurs when both water sensors 618 detect water; this ensures that both ends of slots 568 are underwater, thus preventing the bilge pump from futilely attempting to pump water when its intake is exposed to open air.

Adapters 554 and 564 of FIGS. 15 through 17 are not required to be of a particular shape, size, or material. Their primary requirements are to interface with the hull shape in question, and to hydraulically connect to the bilge pump either directly or through a hose or other suitable conduit. Thus the shape and size of the adapter, its constituent material(s), its manner of fabrication, and other fabrication details may be dictated by the specifics of the application. Variations might include but not be limited to locating the pump or hose connection on the side instead of the top, or shaping the adapter to fit into a specific location.

The advantages of the present disclosure are numerous. The complete lack of moving parts increases reliability, a very important attribute in marine applications. The adapter can be fabricated from a single shaped or molded piece of plastic, rendering it rust and corrosion proof even in salt water environments. One embodiment can be provided to permit on-the-spot resizing and reshaping to provide a custom fit to the hull in question. Another embodiment can be sold without hull beveling or slots whatsoever, permitting entirely custom adapters to be created with common shop tools by the final installer.

Figure 18:
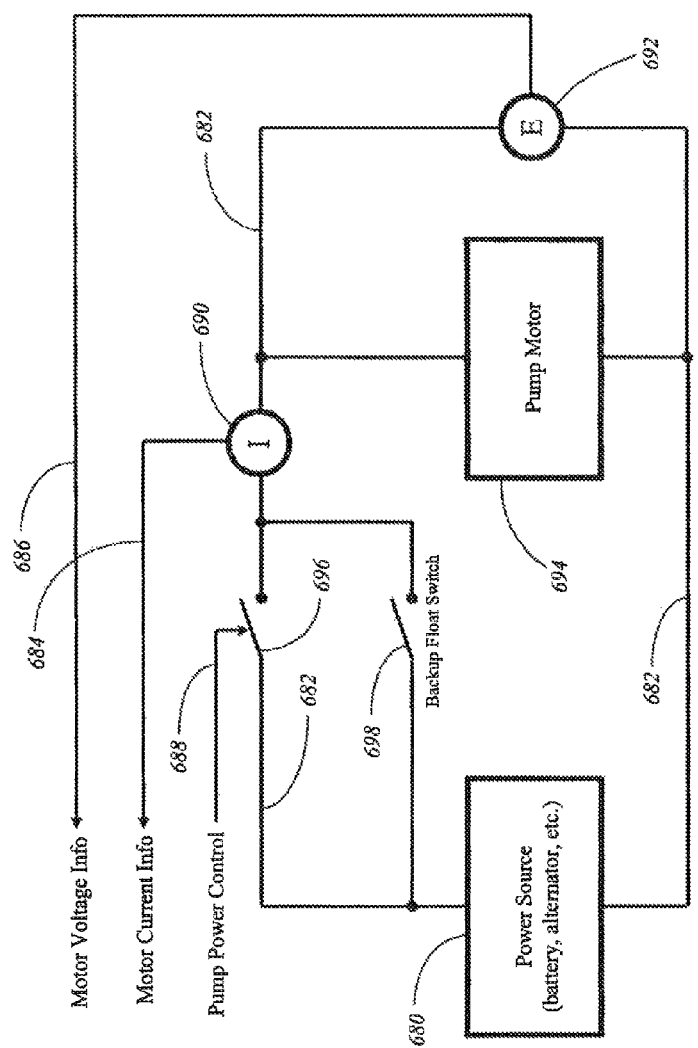
FIG. 18 is a block diagram of a bilge pump configured with voltage and current measurement, a power source, circuit interrupters, a backup float switch, and associated electrical interconnections.

FIG. 18 illustrates one embodiment of bilge pump control and sensing in the present disclosure. Bilge pump 694 comprises an electric motor operatively coupled to a power source 680 such as a battery or alternator. Bilge pump motor 694 is part of a pump such as the Johnson Ultra Ballast Pump (Johnson Pump of America, Inc., 1625 Hunter Road, Suite B, Hanover Park Ill., 60133, United States), a centrifugal style pump such as the Rule 405FC (Xylem Flow Control, 1 Kondelin Road, Cape Ann Industrial Park, Gloucester Mass., 01930, United States), or another pump whose characteristics suit the specific application.

Power to ballast pump motor 694 is controlled by circuit interrupter 696, shown as a single device for clarity but which may be one or more of a manual switch, a relay or functionally similar device controlled by control signal 688, or other components suitable for making and breaking circuit 682 manually or under system control. When circuit interrupter 696 is closed and thus circuit 682 is completed through pump motor 694, the voltage from power source 680 will be applied to pump motor 694 and current will flow through circuit 682.

Backup float switch 698 of FIG. 18 is also supported in addition to the other circuit interrupter devices represented by 696. It is common practice in watercraft construction to include a fail-safe backup float switch that can apply power to bilge pump motor 694 if the bilge water level becomes excessive, without any reliance upon other switches or sensors or components or human intervention. The present disclosure is completely compatible with such emergency bilge switches if their installation is desired.

Continuing with FIG. 18, the conditions and operational condition of bilge pump motor 694 can be monitored by voltage sensor 692, current sensor 690, or both in the same manner as already thoroughly described earlier in this specification for ballast pump motors with respect to FIGS. 2, 20, 21, and 22. Motor voltage info 686, motor current info 684, or both are made available for analysis by processing circuitry, and processing circuitry can control power application to bilge pump motor 694 via pump power control 688 which controls one or more aspects of circuit interrupter 696.

Instrumenting the bilge pump in the manner shown in FIG. 18 yields substantial advantages to the present disclosure of both convenience and safety. For example, the ability to know the operational conditions of bilge pump motor 694 via motor voltage information 686 and motor current information 684 enables the present invention to reduce or eliminate its dependency upon traditional water sensors, which are often the least reliable component in the bilge pumping system. In one embodiment, bilge pump motor 694 could be periodically powered up and then its voltage and current monitored; if motor voltage information 686 or motor current information 684 indicates bilge pump motor 694 is pumping water, power could remain applied until motor voltage information 686 or motor current information 684 indicates that bilge pump motor 694 has evacuated the bilge water. Feedback from bilge pump motor 694 can be indicative of pumping conditions and the operational condition of the associated bilge compartment; if the water level is or becomes too low for the pump to draw water, bilge pump motor 694 will see a reduced workload just as described for a ballast drain pump with respect to FIG. 2 earlier in this specification. In this manner the bilge pump itself becomes the water sensor, allowing reliability to increase and costs to decline.

Another safety enhancement delivered by the present disclosure is the ability to detect certain failure conditions as described earlier in this specification with respect to FIG. 2 for ballast pumps. Loose hoses and failed fittings can occur with bilge pumping systems just as they can ballast systems, and the danger of such an event going undetected in a bilge pumping system can be even more serious. The aforementioned ability of the present disclosure to monitor the operational conditions of bilge pump motor 694 in FIG. 18 can permit the detection of the reduced backpressure resulting from a loose hose or failed fitting. When used in conjunction with one or more sensors such as water sensors 618 of FIGS. 16A and 17A, the present disclosure can sense that water is present independently of the bilge pump and thus know that bilge pump motor 694 of FIG. 18 should see a load commensurate with the pumping of water through its normal backpressure. If water is present yet bilge pump motor 694 does not return appropriate motor voltage information 686 or motor current information 684, the watercraft operator can be notified via indicators 708 and/or 710 of FIG. 19, other bilge pumping systems can be activated, or other appropriate measures taken.

Yet another safety enhancement delivered by the present disclosure is its ability to detect and report failed bilge pumps. As previously described with respect to ballast pumps, electric bilge pumps have two primary failure modes: Open or shorted windings in the pump motor, and seized mechanisms due to bearing failure or debris jammed in the pump. And also as previously described with respect to ballast pumps, both of these conditions can be detected by the present invention via the bilge pump control and sensing advancements shown in FIG. 18—even if there is no water to be pumped out of the bilge. The improvement to boating safety delivered by this aspect of the present disclosure should not be overlooked. It is exceedingly dangerous to operate a watercraft if its bilge pump(s) have failed. The advancements of the present disclosure can inherently provide detection and notification of this exceptionally serious condition as soon as power is first applied—before the watercraft even leaves the dock—and optionally test on a periodic basis while the watercraft is in use. In this manner the present disclosure can substantially improve the safety of watercraft and passengers alike.

As noted earlier in this specification with respect to with ballast pumps, a key advantage of the present disclosure is its ability to be used with standard off-the-shelf bilge pumps. It is not necessary to use customized pumps or pumps with integrated sensors to achieve the advantages noted herein. Indeed, the present disclosure can be easily retrofitted into the vast majority of existing bilge systems already installed on existing watercraft and then continue to use the in-place existing bilge pumps. This includes bilge pumps with integrated water switches as well as pumps using separate "float" style water switches.

This applicability significantly expands the quantity of watercraft that can benefit from the present disclosure. This is especially important when considering the safety issues associated with traditionally undiscovered failures of bilge pumps. The ability to economically bring the advantages of the present disclosure to existing watercraft and their existing bilge pumps can substantially improve the safety of in-service vessels at a cost more likely to be within the reach of their owners.

Figure 19:
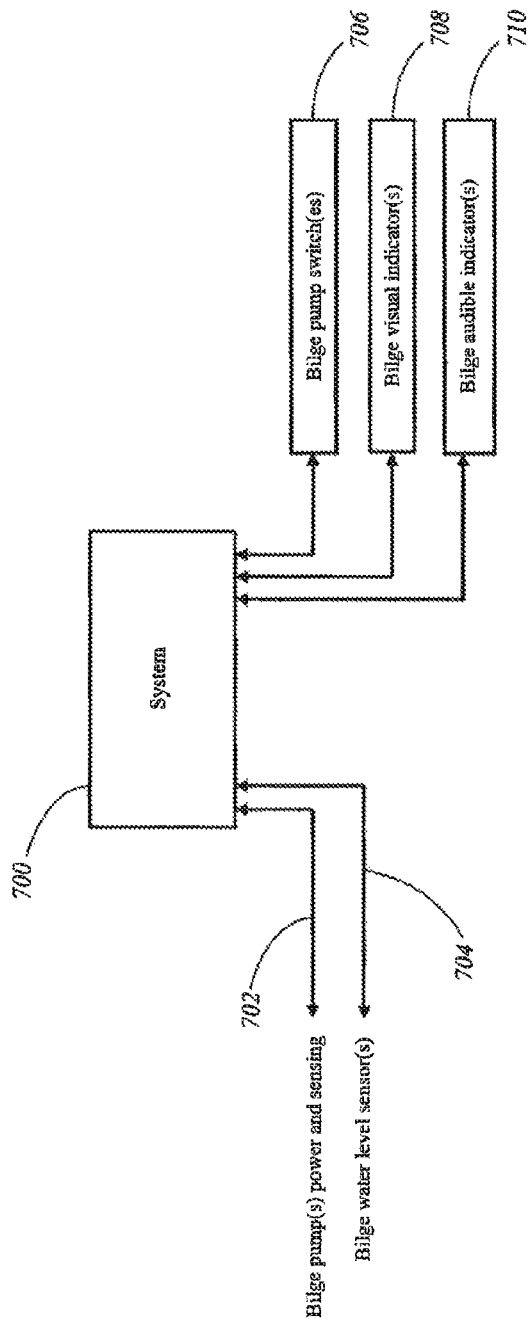
FIG. 19 is a block diagram of a watercraft bilge pump control system with connections to associated components.

FIG. 19 illustrates one embodiment of the present disclosure. System 700 interacts with bilge pump power and sensing signals via connection 702, and with bilge water level sensors via connection 704. In some embodiments, system 700 will comprise processing circuitry similar to that extensively described earlier with respect to ballast pump systems and monitoring. Such processing circuitry can include memory for storing data associated with the bilge pumps and the bilge compartments, including motor current and motor voltage values, elapsed time to drain bilge compartments, and other parameters.

Continuing with FIG. 19, system 700 also supports user interfaces comprising manual switches 706, visual indicators 708, and audible indicators 710 at the watercraft console or other locations. Indicators 708 and 710 can comprise indications of bilge pump conditions and/or bilge compartment conditions. One embodiment can provision system 700 as a standalone bilge pumping system. Other embodiments can provision system 700 in combination with other systems or components.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A wakeboat hull control system comprising:
a first accelerometer operatively associated with the hull of a wakeboat, wherein the first accelerometer is operatively associated with the hull of the wakeboat to measure the acceleration of the hull along a first axis;
a second accelerometer operatively associated with the hull of a wakeboat, wherein the second accelerometer is operatively associated with the hull of the wakeboat to measure the acceleration of the hull along a second axis, the first axis being non-parallel to the second axis; and
processing circuitry coupled to and receiving measurements from the first accelerometer and the second accelerometer, the processing circuitry calculating the rotation of the hull of the wakeboat about a third axis based on the acquired measurements; and,
at least one ballast compartment aboard the wakeboat, the processing circuitry configured to change an amount of ballast in the ballast compartment to adjust the rotation of the hull of the wakeboat about the third axis.

2. The wakeboat hull control system of claim 1 wherein the third axis is the yaw axis of the hull of the wakeboat.

3. The wakeboat hull control system of claim 1 further comprising at least one trim plate on the hull of the wakeboat, the trim plate coupled to and operated by the processing circuitry, the processing circuitry operating the trim plate to adjust the rotation of the hull of the wakeboat about the third axis.

4. A wakeboat hull control method comprising:
using processing circuitry to acquire measurements of both a first acceleration of a hull of a wakeboat along a first axis and a second acceleration of the hull of a wakeboat along a second axis that is non-parallel to the first axis; and
using the processing circuitry to calculate the rotation of the hull of the wakeboat about a third axis based on the acquired measurements; and,
using the processing circuitry to change an amount of ballast in at least one ballast compartment aboard the wakeboat to affect the rotation of the hull of the wakeboat about the third axis.

5. The wakeboat hull control method of claim 4 wherein the third axis is the yaw axis of the hull of the wakeboat.

6. The wakeboat hull control method of claim 4 further comprising using the processing circuitry to change the position of a trim plate on the hull of the wakeboat to affect the rotation of the hull of the wakeboat about the third axis.

7. The wakeboat hull control method of claim 6 further comprising selectively disabling the changing of the trim plate position based on the steering direction of the wakeboat.

8. The wakeboat control method of claim 4 further comprising using the processing circuitry to selectively filter the first and/or second measurements.

9. The wakeboat control method of claim 4 further comprising using a user interface to selectively display one or more of the first acceleration, the second acceleration, and/or the rotation of the hull of the wakeboat about the third axis.

10. The wakeboat control method of claim 4 further comprising using a memory in the processing circuitry to store and/or recall the rotation of the hull of the wakeboat about the third axis.

11. The wakeboat control system of claim 1, further comprising a hull control device wherein said hull control device is a wake diverter plate.

* * * * *